US012812625B2

(12) United States Patent
Jung et al.

(10) Patent No.: US 12,812,625 B2
(45) Date of Patent: Nov. 24, 2026

(54) METHOD AND DEVICE FOR DETERMINING VALIDITY OF SYSTEM INFORMATION IN PRIVATE NETWORK

(71) Applicant: Samsung Electronics Co., Ltd., Suwon-si (KR)

(72) Inventors: Sangyeob Jung, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 18/579,805

(22) PCT Filed: Aug. 5, 2022

(86) PCT No.: PCT/KR2022/011644
§ 371 (c)(1),
(2) Date: Jan. 16, 2024

(87) PCT Pub. No.: WO2023/014159
PCT Pub. Date: Feb. 9, 2023

(65) Prior Publication Data
US 2024/0323947 A1 Sep. 26, 2024

(30) Foreign Application Priority Data
Aug. 5, 2021 (KR) ........................ 10-2021-0103470

(51) Int. Cl.

| | |
|---|---|
| ***H04W 72/12*** | (2023.01) |
| ***H04W 72/51*** | (2023.01) |
| ***H04W 76/20*** | (2018.01) |
| ***H04W 84/04*** | (2009.01) |

(52) U.S. Cl.
CPC ........... *H04W 72/12* (2013.01); *H04W 72/51* (2023.01); *H04W 76/20* (2018.02); *H04W 84/042* (2013.01)

(58) Field of Classification Search
CPC ...... H04W 72/12; H04W 72/51; H04W 76/20
See application file for complete search history.

(56) References Cited

U.S. PATENT DOCUMENTS

2020/0245235 A1 7/2020 Chun
2022/0014980 A1 * 1/2022 Tseng .................... H04W 76/30
2023/0180227 A1 * 6/2023 Jia ......................... H04W 36/00 370/329

FOREIGN PATENT DOCUMENTS

WO 2021066714 A1 4/2021
WO 2022211531 A1 10/2022

OTHER PUBLICATIONS

Supplementary European Search Report dated Oct. 22, 2024, in connection with European Application No. 22853534.0, 13 pages.
(Continued)

*Primary Examiner* — Derrick V Rose

(57) ABSTRACT

The disclosure relates to a $5^{th}$ generation (5G) or $6^{th}$ generation (6G) communication system for supporting a higher data transmission rate. A wireless communication system according to an embodiment of the disclosure provides a method by which a user equipment (UE) supporting a non-public network (NPN) determines validity of a system information block (SIB) and obtains or re-obtains an SIB.

13 Claims, 11 Drawing Sheets

(56) References Cited

OTHER PUBLICATIONS

Nokia, et al., "Corrections for NPNs," R2-2008215, 3GPP TSG-RAN WG2 Meeting #111 Electronic, Aug. 17-28, 2020, 16 pages.
Samsung Electronics, "Corrections to SIB validity for NPN only cell," R2-2109074, 3GPP TSG-RAN2 Meeting #115 Electronic, Aug. 9-26, 2021, 4 pages.
International Search Report and Written Opinion of the International Searching Authority dated Nov. 16, 2022, in connection with International Application No. PCT/KR2022/011644, 14 pages.
3GPP TS 38.331 V16.5.0 (Jun. 2021), Technical Specification, 3rd Generation Partnership Project; Technical Specification Group Radio Access Network; NR; Radio Resource Control (RRC) protocol specification (Release 16), Jun. 2021, 959 pages.
Catt, et al., "Corrections on posSIB validity," R2-2100403, 3GPP TSG-RAN WG2 Meeting #113 electronic, Online, Jan. 25-Feb. 5, 2021, 4 pages.
Fujitsu, "The validity of a stored SIB if SI Area ID is absent," R2-2100751, 3GPP TSG-RAN WG2 Meeting #113 electronic, Online, Jan. 25-Feb. 5, 2021, 6 pages.
Google Inc, "Correction on SIB validity check," R2-2101654, 3GPP TSG-RAN2 Meeting #113-e, eMeeting, Jan. 25-Feb. 5, 2021, 8 pages.
Vivo, "Clarification of cell Identity for SIB validity," R2-2105368, 3GPP TSG-RAN WG2 Meeting #114-e, Electronic, Apr. 12-20, 2021, 4 pages.

* cited by examiner

METHOD AND DEVICE FOR DETERMINING VALIDITY OF SYSTEM INFORMATION IN PRIVATE NETWORK

TECHNICAL FIELD

The disclosure relates to a wireless communication system, and more particularly, to a method and device for determining validity of system information in a private network.

BACKGROUND ART

5th generation (5G) mobile communication technologies define broad frequency bands so that high transmission rates and new services are possible, and may be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE

Technical Problem

The disclosure provides a method and device for determining validity of system information in a private network.

Technical Solution

An operating method of a user equipment (UE) in a wireless communication system according to an embodiment of the disclosure may include receiving a system information block (SIB) from a serving cell, identifying a value of areaScope included in si-SchedulingInfo for the received SIB and a value of areaScope for a previously stored SIB, determining whether the serving cell is a non-public network (NPN)-only cell, when the serving cell is the NPN-only cell and the UE is an NPN capable UE, determining whether NPN-related parameters included in the si-SchedulingInfo are identical to NPN-related parameters included in the previously stored SIB, and when the NPN-related parameters are identical, determining that the previously stored SIB is valid for the serving cell, and otherwise, determining that the previously stored SIB is not valid for the serving cell.

The determining whether the previously stored SIB is valid may include, when the serving cell is the NPN-only cell and the UE is the NPN capable UE, determining whether the previously stored SIB is valid without determining whether public land mobile network (PLMN)-related parameters included in the si-SchedulingInfo are identical to PLMN-related parameters included in the previously stored SIB.

The identifying of the value of the areaScope may include identifying whether the areaScope value for the previously stored SIB is identical to the areaScope value in the si-SchedulingInfo for the SIB received from the serving cell.

The determining whether the NPN parameters are identical may include determining whether a first NPN identity included in an NPN-IdentityInfoList, and a systemInformationAreaID and a valueTag that are included in the si-SchedulingInfo are identical to an NPN identity, a system InformationAreaID, and a valueTag associated with the previously stored SIB.

The identifying of the value of the areaScope may include identifying whether there is no areaScope for the previously stored SIB and the areaScope value is not included in the si-SchdulingInfo for the SIB from the serving cell.

The determining whether the NPN parameters are identical may include determining whether a first NPN identity included in an NPN-IdentityInfoList, and a CellIdentity and a valueTag that are included in the si-SchedulingInfo are identical to an NPN identity, a CellIdentity, and a valueTag associated with the previously stored SIB.

The operating method may further include, when it is determined that the previously stored SIB is not valid for the serving cell, re-obtaining an SIB from the serving cell.

The NPN-only cell may be a cell available only to an NPN subscriber.

A user equipment (UE) in a wireless communication system according to an embodiment of the disclosure may include a transceiver, and at least one processor connected to the transceiver, wherein the at least one processor is configured to receive a system information block (SIB) from a serving cell, identify a value of areaScope included in si-SchedulingInfo for the received SIB and a value of areaScope for a previously stored SIB, determine whether the serving cell is a non-public network (NPN)-only cell, when the serving cell is the NPN-only cell and the UE is the NPN capable UE, determine whether NPN-related parameters included in the si-SchedulingInfo are identical to NPN-related parameters included in the previously stored SIB, and when the NPN-related parameters are identical, determine that the previously stored SIB is valid for the serving cell, and otherwise, determine that the previously stored SIB is not valid for the serving cell.

Advantageous Effects

The disclosed embodiments provide apparatuses and methods capable of effectively providing services in a wireless communication system.

MODE FOR INVENTION

Figure 1A:
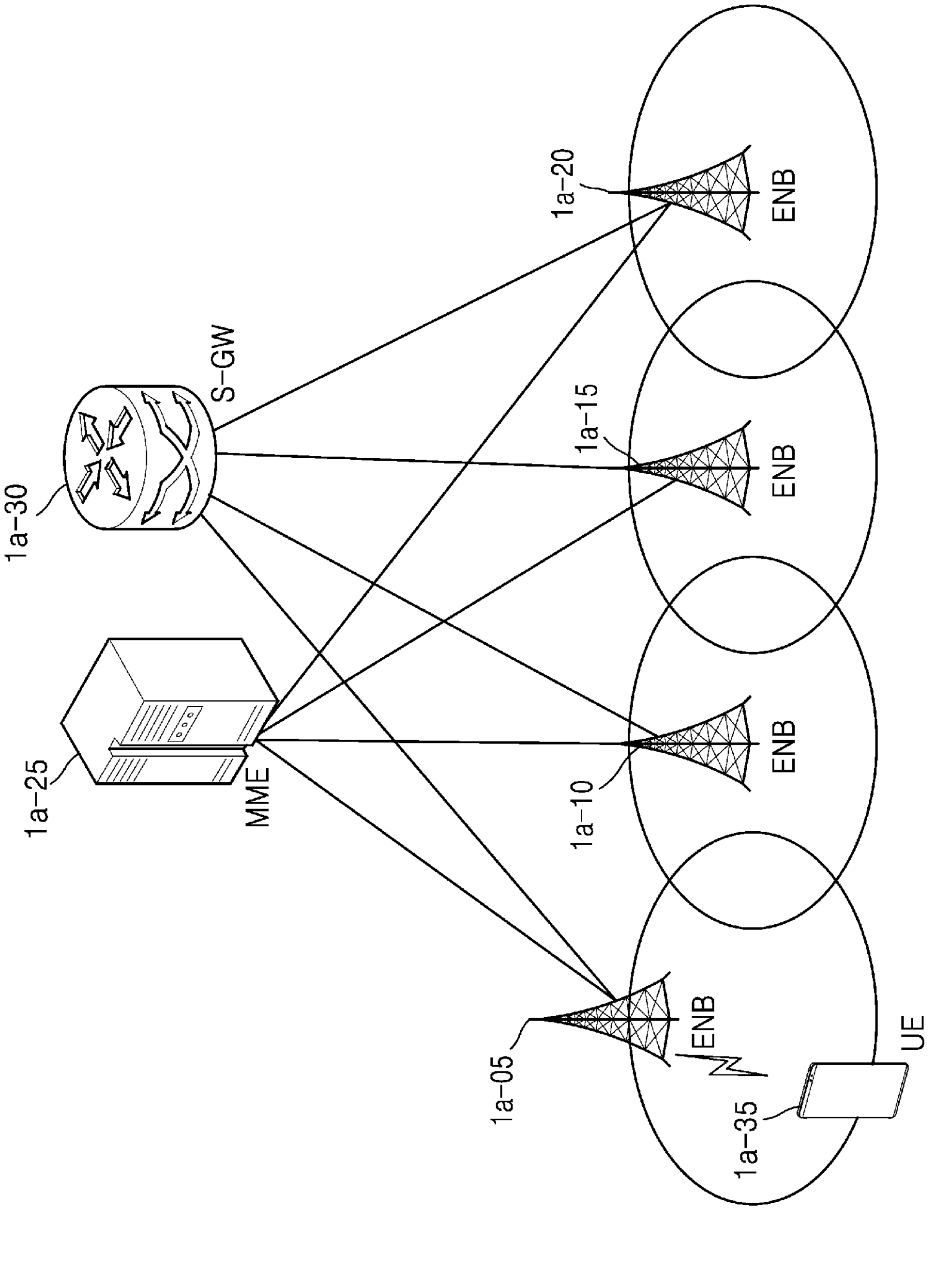
FIG. 1A is a diagram illustrating a structure of a long term evolution (LTE) system, according to an embodiment of the disclosure.

Hereinafter, operation principles of the disclosure will be described with reference to the accompanying drawings. While describing the disclosure, detailed descriptions of related well-known functions or configurations that may blur the points of the disclosure are omitted. The terms used herein are those defined in consideration of functions in the disclosure, but the terms may vary according to the intention of users or operators, precedents, etc. Hence, the terms used herein should be defined based on the meaning of the terms together with the descriptions throughout the specification.

For the same reasons, some elements are exaggerated, omitted, or schematically illustrated in drawings. Also, the size of each element may not substantially reflect its actual size. In each drawing, the same or corresponding element is denoted by the same reference numeral.

The advantages and features of the disclosure, and methods of achieving the same, will become apparent with reference to embodiments of the disclosure described below in detail in conjunction with the accompanying drawings. However, the disclosure may be embodied in many different forms and should not be construed as being limited to the embodiments set forth below. Rather, the embodiments are provided so that the disclosure will be thorough and complete and will fully convey the concept of the disclosure to one of ordinary skill in the art to which the disclosure pertains, and the disclosure will only be defined by the appended claims.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for performing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions stored in the flowchart block(s). Because the computer program instructions may also be loaded into a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in reverse order, according to the functionality involved.

The term "... unit" used in the present embodiment of the disclosure refers to a software or hardware component, such as a field-programmable gate array (FPGA) or an application-specific integrated circuit (ASIC), which performs certain tasks. However, the term "... unit" does not mean to be limited to software or hardware. A "... unit" may be configured to be in an addressable storage medium or may be configured to operate one or more processors. Accordingly, a "... unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "... units" may be combined into fewer elements and "... units" or may be further separated into additional components and "... units". Furthermore, components and "... units" may be implemented to operate one or more central processing units (CPUs) in a device or a secure multimedia card. Also, a "... unit" in an embodiment may include one or more processors.

In the following descriptions of the disclosure, well-known functions or configurations are not described in detail because they would obscure the disclosure with unnecessary details. Hereinafter, embodiments of the disclosure will be described with reference to the drawings.

Hereinafter, terms for identifying access nodes, terms indicating network entities, terms indicating messages, terms indicating interfaces between network entities, and terms indicating various identification information used herein are exemplified for convenience of explanation. Accordingly, the disclosure is not limited to terms described below, and other terms denoting objects having the same technical meanings may be used.

Hereinafter, some terms and names defined in the 3$^{rd}$ generation partnership project long term evolution (3GPP LTE) standards may be used for convenience of explanation. However, the disclosure is not limited to the terms and names, and may also be applied to systems following other standards. In the disclosure, an eNB may be interchangeably used with a gNB for convenience of explanation. That is, a base station described as an eNB may represent a gNB.

Hereinafter, a base station is an entity that allocates resources to a UE and may be at least one of a gNode B, an eNode B, a node B, a base station (BS), a radio access unit, a base station controller, or a node on a network. Examples of a UE may include a user equipment (UE), a mobile station (MS), a cellular phone, a smartphone, a computer, or a multimedia system capable of performing a communication function. However, the disclosure is not limited to the above examples.

Also, although embodiments of the disclosure will be described below by using an LTE, LTE-A, LTE Pro, or 5G (or new radio (NR) as next-generation mobile communication) as an example, the embodiments of the disclosure may also be applied to other communication systems having similar technical backgrounds or channel forms. The embodiment of the disclosure may be applied to other communication systems through some modifications without departing from the scope of the disclosure based on determination by one of ordinary skill in the art.

In the following descriptions of the disclosure, well-known functions or configurations are not described in detail because they would obscure the disclosure with unnecessary details. Hereinafter, the embodiments of the disclosure will now be described with reference to the accompanying drawings.

FIG. 1A is a diagram illustrating a structure of an LTE system, according to an embodiment of the disclosure.

Referring to FIG. 1A, a radio access network of an LTE system includes next-generation base stations (hereinafter, evolved node Bs (ENBs), node Bs, or base stations) 1*a*-05, 1*a*-10, 1*a*-15, and 1*a*-20, a mobility management entity (MME) 1*a*-25, and a serving-gateway (S-GW) 1*a*-30. A user UE (hereinafter, a user equipment (UE) or a UE) 1*a*-35 may access an external network through the ENBs 1*a*-05, 1*a*-10, 1*a*-15, and 1*a*-20 and the S-GW 1*a*-30.

In FIG. 1A, the ENBs 1*a*-05, 1*a*-10, 1*a*-15, and 1*a*-20 may correspond to existing node Bs of a universal mobile telecommunication system (UMTS). The ENBs may be connected to the UE 1*a*-35 via a wireless channel and may perform a more complicated function than the existing node Bs. In the LTE system, all user traffic including a real-time service, such as a voice over Internet protocol (VOIP) service, may be provided through a shared channel, and thus a device that collects state information, such as UEs' buffer states, an available transmission power state, and a channel state, and performs scheduling is required. The ENBs 1*a*-05 to 1*a*-20 may be responsible for these functions. One ENB may generally control a plurality of cells. For example, in order to implement a transmission rate of 100 Mbps, the LTE system may use, for example, orthogonal frequency division multiplexing (OFDM) in a bandwidth of 20 MHz as a radio access technology. Of course, the radio access technology that may be used by the LTE system is not limited to the above example.

Also, the ENBs 1*a*-05, 1*a*-10, 1*a*-15, and 1*a*-20 may use adaptive modulation and coding (AMC) to determine a modulation scheme and a channel coding rate in accordance with a channel state of a UE. The S-GW 1*a*-30 is a device that provides a data bearer, and may add or remove a data bearer under the control of the MME 1*a*-25. The MME is an entity for performing a mobility management function and various control functions for the UE and may be connected to a plurality of base stations.

Figure 1B:
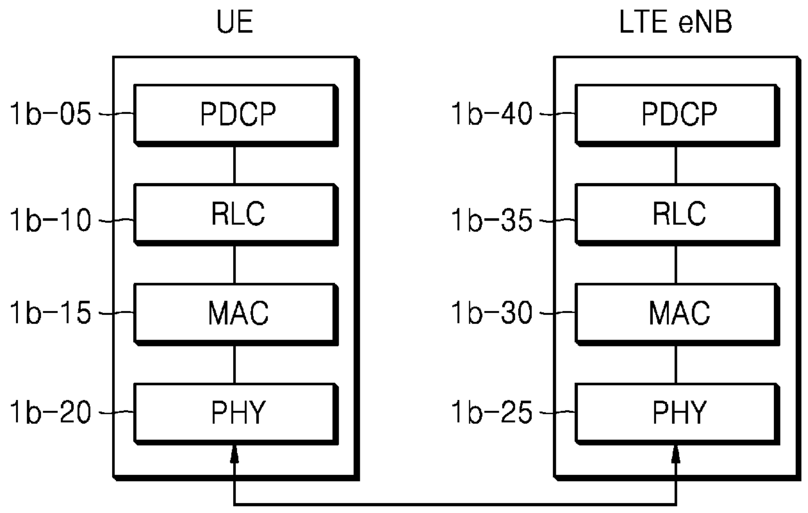
FIG. 1B is a diagram illustrating a radio protocol architecture of an LTE system, according to an embodiment of the disclosure.

FIG. 1B is a diagram illustrating a radio protocol architecture of an LTE system, according to an embodiment of the disclosure.

Referring to FIG. 1B, a radio protocol architecture of an LTE system includes packet data convergence protocols (PDCPs) 1*b*-05 and 1*b*-40, radio link controls (RLCs) 1*b*-10 and 1*b*-35, and medium access controls (MACs) 1*b*-15 and 1*b*-30 of respectively at a UE and an eNB. The PDCPs 1*b*-05 and 1*b*-40 perform operations such as IP header compression/reconstruction. The main functions of the PDCPs are summarized as shown below. However, the functions of the PDCPs are not limited to the following examples.

- Header compression and decompression: robust header compression (ROHC) only
- Transfer of user data
- In-sequence delivery of upper layer packet data units (PDUs) at PDCP re-establishment procedure for RLC acknowledged mode (AM)
- For split bearers in DC (only support for RLC AM): PDCP PDU routing for transmission and PDCP PDU reordering for reception
- Duplicate detection of lower layer SDUs at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink The RLCs 1*b*-10 and 1*b*-35 may perform an automatic repeat request (ARQ) operation by reconstructing a PDCP PDU to an appropriate size. The main functions of the RLCs are summarized as follows. However, the functions of the RLCs are not limited to the following examples.

- Transfer of upper layer PDUs
- ARQ (error correction through ARQ (only for AM data transfer))
- Concatenation, segmentation, and reassembly of RLC SDUs (only for unacknowledged (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MACs 1*b*-15 and 1*b*-30 may be connected to a plurality of RLC layer devices configured in one UE, and may multiplex RLC PDUs into MAC PDUs and demultiplex RLC PDUs from MAC PDUs. The main functions of the MACs are summarized as follows. However, the functions of the MACS are not limited to the following examples.

- Mapping between logical channels and transport channels
- Multiplexing/demultiplexing of MAC SDUs belonging to one or different logical channels into/from transport blocks (TB) delivered to/from the physical layer on transport channels
- Scheduling information reporting
- Hybrid automatic repeat request (HARQ) (error correction through HARQ)
- Priority handling between logical channels of one UE
- Priority handling between UEs by means of dynamic scheduling
- Multimedia broadcast multicast service (MBMS) identification
- Transport format selection
- Padding Physical (PHY) layers 1*b*-20 and 1*b*-25 channel-code and modulate higher layer data into OFDM symbols and transmit the OFDM symbols through a radio channel, or may demodulate OFDM symbols received through a radio channel and channel-decode and deliver the OFDM symbols to a higher layer.

Figure 1C:
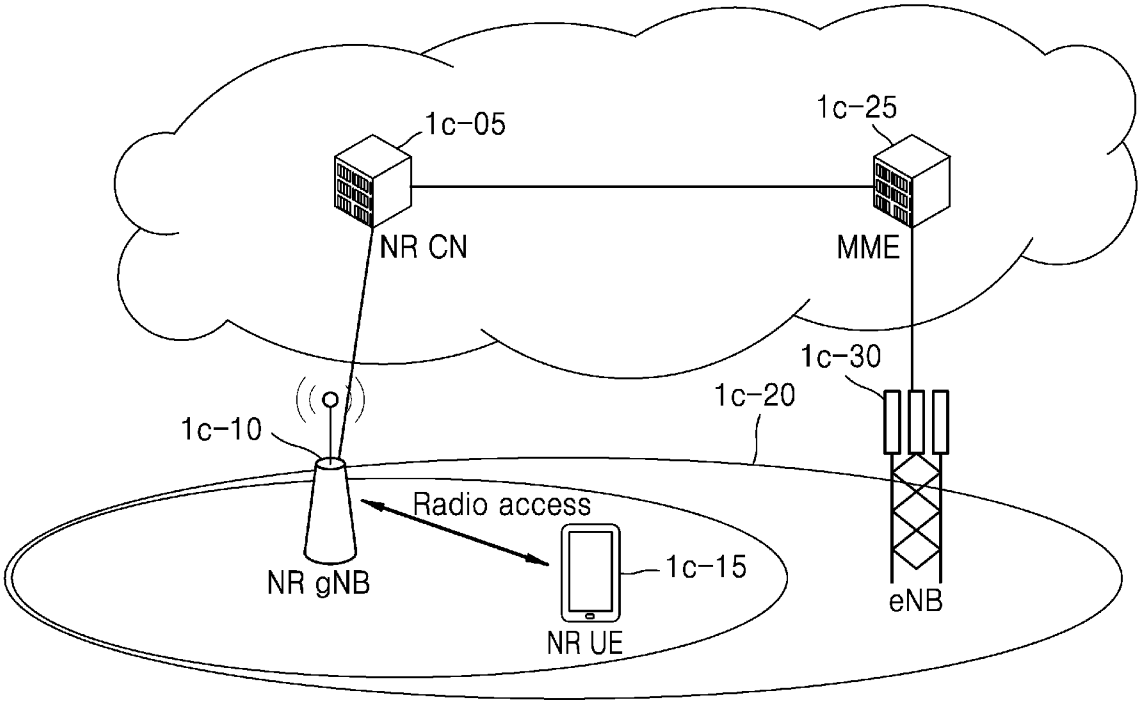
FIG. 1C is a diagram illustrating a structure of a next-generation mobile communication system, according to an embodiment of the disclosure.

FIG. 1C is a diagram illustrating a structure of a next-generation mobile communication system, according to an embodiment of the disclosure.

Referring to FIG. 1C, a radio access network of the next-generation mobile communication system (hereinafter, a new radio (NR) or 2G) may include a next-generation base station (hereinafter, an NR node B (NR NB) (e.g., a new radio node B (NR gNB), a gNB, or an NR base station) 1*c*-10 and a new radio core network (NR CN) 1*c*-05. A user UE (e.g., a new radio user equipment (NR UE) or a UE) 1*c*-15 may access an external network 1*c*-20 through the NR gNB 1*c*-10 and the NR CN 1*c*-05.

In FIG. 1C, the NR gNB 1*c*-10 may correspond to an evolved node B (eNB) of an existing LTE system. The NR gNB is connected to the NR UE 1*c*-15 via a wireless channel and may provide far better services than an existing node B. In the next-generation mobile communication system, all user traffic is provided through a shared channel, and thus a device that collects state information, such as UEs' buffer states, an available transmission power state, and a channel state, and performs scheduling is required. The NR gNB 1*c*-10 may be responsible for these functions. One NR gNB generally controls a plurality of cells. According to an embodiment of the disclosure, the next-generation mobile communication system may have a bandwidth equal to or greater than an existing maximum bandwidth of current LTE to achieve an ultra-high data rate, and beamforming technology may be additionally used by using OFDM as a radio access technology. Also, AMC may be applied to determine a modulation scheme and a channel coding rate according to a channel state of a UE.

The NR CN 1*c*-05 may perform functions such as mobility support, bearer setup, and quality of service (QOS) setup. The NR CN 1*c*-05 is an entity for performing a mobility management function and various control functions on the UE and may be connected to a plurality of base stations. Also, the next-generation mobile communication system may interoperate with the existing LTE system, and the NR CN 1*c*-05 may be connected to an MME 1*c*-25 through a network interface. The MME may be connected to an eNB 1*c*-30 that is an existing base station.

Figure 1D:
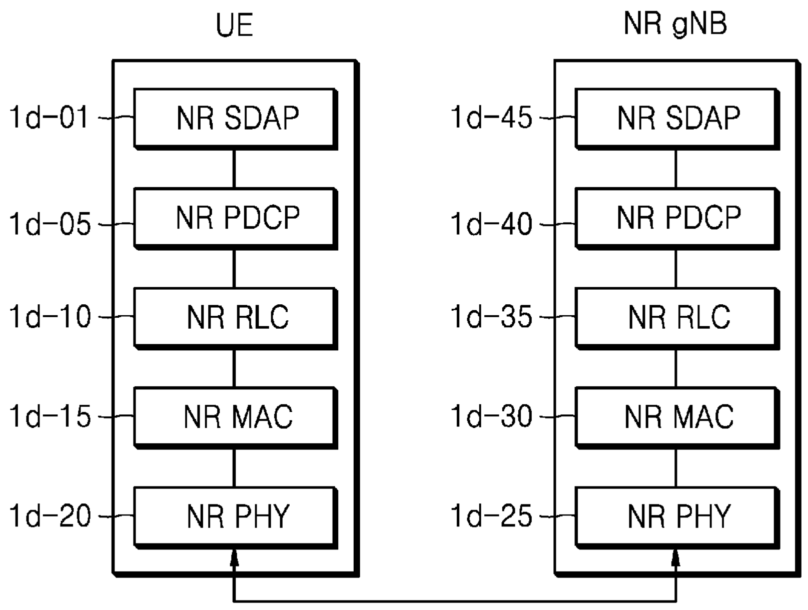
FIG. 1D is a diagram illustrating a radio protocol architecture of a next-generation mobile communication system, according to an embodiment of the disclosure.

FIG. 1D is a diagram illustrating a radio protocol architecture of a next-generation mobile communication system, according to an embodiment of the disclosure.

FIG. 1D is a diagram illustrating a radio protocol architecture of a next-generation mobile communication system to which the disclosure may be applied.

Referring to FIG. 1D, a radio protocol of a next-generation mobile communication system includes NR service data adaptation protocols (SDAPs) 1*d*-01 and 1*d*-45, NR packet data convergence protocols (PDCPs) 1*d*-05 and 1*d*-40, NR RLCs **1*d*-10 and 1*d*-35, and NR MACs 1*d*-15 and 1*d*-30**, respectively at a UE and an NR base station.

According to an embodiment of the disclosure, the main functions of the NR SDAPs **1*d*-01 and 1*d*-45 may include some of the following functions. However, the functions of the NR SDAPs 1*d*-01 and 1*d*-45** are not limited to the following examples.

Transfer of user plane data
Mapping between a QoS flow and a data radio bearer (DRB) for both DL and UL
Marking QoS flow ID in both DL and UL packets
Reflective QoS flow to DRB mapping for the UL SDAP PDUs Regarding an SDAP layer device, the UE may receive a configuration about whether to use a header of the SDAP layer device or whether to use a function of the SDAP layer device for each PDCP layer, each bearer, or each logical channel via a radio resource control (RRC) message. When an SDAP header is configured, a one-bit non-access stratum (NAS) QoS reflective indicator (NAS reflective QoS) and a one-bit AS QoS reflective indicator (AS reflective QoS) of the SDAP header may indicate the UE to update or reconfigure mapping information between a QoS flow and a data bearer for UL and DL. The SDAP header may include QoS flow ID information indicating the QoS. Also, according to an embodiment of the disclosure, the QoS information may be used as data processing priority, scheduling information, etc. for supporting a smooth service.

According to an embodiment of the disclosure, the main functions of the NR PDCPs **1*d*-05 and 1*d*-40 may include some of the following functions. However, the functions of the NR PDCPs 1*d*-05 and 1*d*-40** are not limited to the following examples.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above description, a reordering function of an NR PDCP layer may indicate a function of reordering PDCP PDUs received from a lower layer based on PDCP sequence numbers (SNs). Also, the reordering function of the NR PDCP layer may include a function of delivering data to a higher layer in a reordered order, a function of directly delivering data without considering the order, a function of reordering the order and recording lost PDCP PDUs, a function of reporting a state of the lost PDCP PDUs to a transmission side, and requesting retransmission of the lost PDCP PDUs.

According to an embodiment of the disclosure, the main functions of the NR RLCs **1*d*-10 and 1*d*-35 may include some of the following functions. However, the functions of the NR RLCs 1*d*-10 and 1*d*-35** are not limited to the following examples.

Transfer of upper layer PDUs
In-sequence delivery of upper layer PDUs
Out-of-sequence delivery of upper layer PDUs
ARQ (error correction through ARQ)
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, an in-sequence delivery function of an NR RLC layer may indicate a function of in-sequence delivering RLC SDUs received from a lower layer to a higher layer. When one original RLC SDU is segmented into multiple RLC SDUs and received, the in-sequence delivery function of the NR RLC layer may include a function of reassembling the RLC SDUs that are divided into multiple ones and delivering the RLC SDUs.

Also, the in-sequence delivery function of the NR RLC layer may include a function of reordering the received RLC PDUs based on RLC SNs or PDCP SNs, a function of reordering the order and recording lost PDCP PDUs, a function of reporting a state of the lost PDCP PDUs to a transmission side, and a function of requesting retransmission of the lost PDCP PDUs.

Also, the in-sequence delivery function of the NR RLC layer may include a function of, when there are the lost RLC SDUs, in-sequence delivering only RLC SDUs before the lost RLC SDUs to a higher layer, a function of, when a certain timer has expired even when there are the lost RLC SDUs, in-sequence delivering all RLC SDUs received before the start of the timer to a higher layer, or a function of, when a certain timer has expired even when there are the lost RLC SDUs, in-sequence delivering all RLC SDUs received until now to a higher layer.

Also, through an out-of-sequence delivery function, the NR RLCs **1*d*-10 and 1*d*-35 may process RLC PDUs in order of reception (in order of arrival regardless of the order of sequence numbers) and may deliver the processed RLC PDUs to a PDCP layer regardless of a sequence, Also, when the NR RLCs 1*d*-10 and 1*d*-35** receive segments, the NR RLCs may receive segments that are stored in a buffer or to be received later, may reconfigure and process the segments into one complete RLC PDU, and then may deliver the RLC PDU to the PDCP layer.

Also, the NR RLCs **1*d*-10 and 1*d*-35** may not include a concatenation function, and the concatenation function may be performed by an NR MAC layer, or may be replaced with a multiplexing function of the NR MAC layer.

In the above description, an out-of-sequence delivery function of an NR RLC layer may indicate a function of delivering RLC SDUs received from a lower layer directly to a higher layer regardless of an order. An out-of-sequence delivery function of an NR RLC layer may include a function of, when one RLC SDU is segmented into multiple RLC SDUs and received, reassembling and delivering the received RLC SDUs or a function of storing an RLC SN or PDCP SN of the received RLC PDUs, ordering a sequence, and recording lost RLC PDUs.

The NR MACs **1*d*-15 and 1*d*-30 may be connected to multiple NR RLC layer devices configured in one UE, and the main functions of the NR MACs 1*d*-15 and 1*d*-30 may include some of the following functions. However, the functions of the NR MACs 1*d*-15 and 1*d*-30** are not limited to the following examples.

Mapping between logical channels and transport channels
Multiplexing/demultiplexing of MAC SDUs
Scheduling information reporting
HARQ (error correction through HARQ)
Priority handling between logical channels of one UE
Priority handling between UEs by means of dynamic scheduling
MBMS identification
Transport format selection Padding The NR PHY layers 1_d_-20 and 1_d_-25 may channel-code and modulate higher layer data into OFDM symbols and transmit the OFDM symbols via a wireless channel, or may demodulate OFDM symbols received via a wireless channel and channel-decode and deliver the OFDM symbols to a higher layer. However, the functions of the NR PHY layers 1_d_-20 and 1_d_-25 are not limited thereto.

Figure 1E:
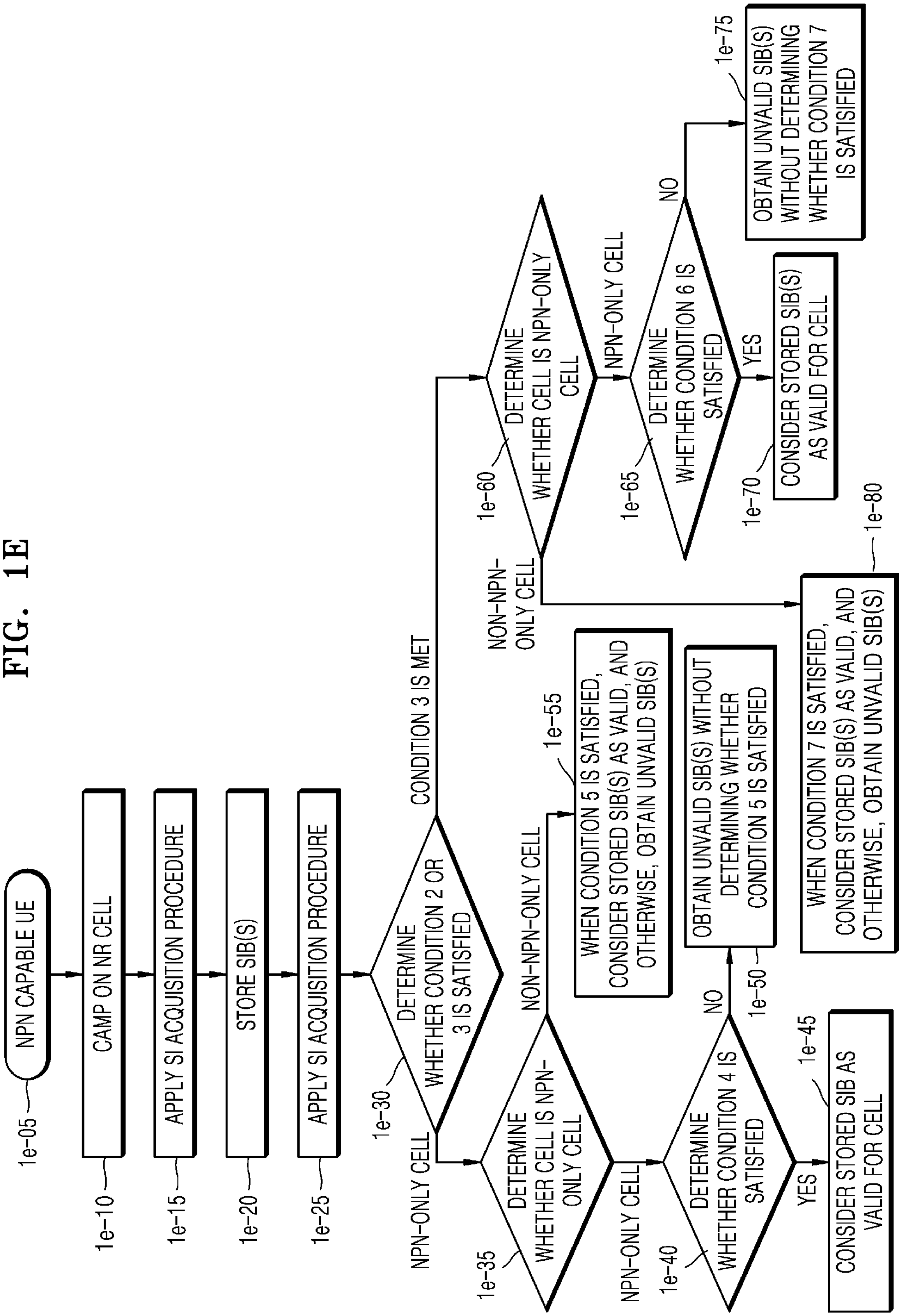
FIG. 1E is a flowchart for describing a process in which a user equipment (UE) supporting a non-public network (NPN) determines validity of a system information block (SIB) and obtains or re-obtains an SIB in a wireless communication system, according to an embodiment of the disclosure.

FIG. 1E is a flowchart for describing a process in which a UE supporting a non-public network (NPN) determines validity of a system information block (SIB) and obtains or re-obtains an SIB in a next-generation communication system.

Referring to FIG. 1E, a UE 1_e_-05 may support an NPN function. In the disclosure, a UE supporting an NPN function may be referred to as an NPN capable UE. An NPN function may refer to a function for communication in an NPN.

In operation 1_e_-10, the NPN capable UE 1_e_-05 may select an NR cell and may camp on the NR cell. An NR cell may be referred to as a serving cell.

In operation 1_e_-15, the NPN capable UE 1_e_-05 may apply a system information (SI) acquisition procedure from the camped-on NR cell to obtain a master information block (MIB), a system information block1 (SIB1), and one or more SI messages (messages including one or more SIBs). The one or more SI messages (or messages including one or more SIBs) may include, but are not limited to, SIB2, SIB3, SIB4, and SIB5.

In operation 1_e_-20, the NPN capable UE 1_e_-05 may store the obtained SIB(s). That is, the NPN capable UE 1_e_-05 may store at least one of the MIB, the SIB1, and the one or more SI messages obtained by applying the SI acquisition procedure in operation 1_e_-15.

When Condition 1 is satisfied (i.e., it is determined that the serving cell is an NPN-only cell), the UE 1_e_-05 may perform Operation 1 below. When Condition 1 is not satisfied, (i.e., it is determined that the serving cell is a non-NPN-only cell), the UE 1_e_-05 may perform Operation 2 below. According to an embodiment of the disclosure, an NPN-only cell may refer to a cell that may be used only by an NPN subscriber, and a non-NPN-only cell may refer to a cell that may be used even when a user is not an NPN subscriber.

Condition 1: If a cellReservedForOtherUse information element (IE) in the SIB1 broadcast by the serving cell is set to true and an npn-IdentityInfoList IE is present in CellAccessRelataedInfo (when Condition 1 is satisfied, the UE determines that the serving cell is an NPN-only cell)

Operation 1: The UE shall store the associated areaScope, if present, the first NPN identity (SNPN identity in case of SNPN, or PNI-NPN identity in case of PNI-NPN) in the NPN-IdentityInfoList for NPN-only cells, the cellIdentity, the systemInformationAreaID, if present, and the value Tag, if present, as indicated in the si-SchedulingInfo for the SIB. SNPN identity is identified by a PLMN identity and a NID, and PNI-NPN identity is identified by a PLMN identity and a CAG-ID.

Operation 2: The UE shall store the associated areaScope, if present, the first PLMN-Identity in the PLMN-IdentityInfoList for non-NPN-only cells, the cellIdentity, the systemInformationAreaID, if present, and the value Tag, if present, as indicated in the si-SchedulingInfo for the SIB.

In operation 1_e_-25, the NPN capable UE 1_e_-05 may apply a system information (SI) acquisition procedure from the serving NR cell when a certain event occurs. Examples of the certain event may include a case where cell selection or cell reselection occurs, a case where return from out of coverage (not camping on any cell) occurs, a case where reconfiguration with sync completion occurs, a case where return to an NR radio access network (RAT) after using another RAT occurs, and a case where an indicator indicating that system information has changed is received. However, the disclosure is not limited thereto, and may include any event that requires new or additional acquisition of system information.

In operation 1_e_-30 may determine which of the following conditions is satisfied in order to determine whether the SIB(s) stored in operation 1_e_-20 are valid when applying a system information (SI) acquisition procedure from a current serving cell (a serving cell that may be the same as or different from the serving cell in operation 1_e_-10). According to an embodiment of the disclosure, the NPN capable UE 1_e_-05 may first receive an SIB1 from a current serving cell (which may be the same as or different from the serving cell in operation 1_e_-10), may determine whether SIB(s) stored based on the received SIB1 are valid, and may determine whether to re-obtain remaining SIBs other than the SIB1 based on a determination result. The remaining SIBs may include, but are not limited to, SIB2, SIB3, SIB4, SIB5, SIB6, SIB7, SIB8, and SIB9.

Condition 2: If the areaScope is associated and its value for the stored version of the SIB is the same as the value received in the si-SchedulingInfo for that SIB from the serving cell Condition 3: If the areaScope is not present for the stored version of the SIB and the areaScope value is not included in the si-SchedulingInfo for that SIB from the serving cell)

In operation 1_e_-35, when the NPN capable UE 1_e_-05 determines in operation 1_e_-30 that Condition 2 is satisfied, the NPN capable UE 1_e_-05 may determine whether a current serving cell is an NPN-only cell.

In operation 1_e_-40, when the NPN capable UE 1_e_-05 determines in operation 1_e_-35 that a current serving cell is an NPN-only cell, the NPN capable UE 1_e_-05 may determine whether Condition 4 is satisfied. The NPN capable UE 1_e_-05 may determine whether Condition 4 is satisfied based on the received SIB1, or may determine whether Condition 4 is satisfied based on a higher layer signal.

Condition 4: If the first NPN identity included in the NPN-IdentityInfoList, the systemInformationAreaID and the valueTag that are included in the si-SchedulingInfo for the SIB received from the serving cell are identical to the NPN identity, the systemInformationAreaID and the valueTag associated with the stored version of that SIB In operation 1_e_-45, when the NPN capable UE 1_e_-05 determines in operation 1_e_-40 that Condition 4 is satisfied, the NPN capable UE 1_e_-05 may determine that the SIB(s) stored in operation 1_e_-20 are valid. Also, the UE may not obtain an additional SIB from the current serving cell for the stored SIB(s).

In operation 1_e_-50, when the NPN capable UE 1_e_-05 determines in operation 1_e_-40 that Condition 4 is not satisfied, the NPN capable UE 1_e_-05 may determine that the SIB(s) stored in operation 1_e_-20 are not valid and may re-obtain corresponding SIB(s) from the current serving cell. According to the disclosure, the NPN capable UE 1_e_-05 may re-obtain SIB(s) without determining whether Condition 5 is additionally satisfied. That is, when the EU determines the stored SIBs are not valid in an NPN-only cell, the UE may re-obtain SIB(s) without determining whether Condition 5 is satisfied.

Condition 5: If the first PLMN-Identity included in the PLMN-IdentityInfoList, the systemInformationAreaID and the valueTag that are included in the si-SchedulingInfo for the SIB received from the serving cell are identical to the PLMN-Identity, the systemInformationAreaID and the valueTag associated with the stored version of that SIB In operation 1*e*-55, when the NPN capable UE 1*e*-05 determines in operation 1*e*-35 that a current serving cell is a non-NPN-only cell and determines that Condition 5 is satisfied, the NPN capable UE 1*e*-05 determines that the SIB(s) stored in operation 1*e*-20 are valid and does not additionally obtain from the current serving cell for the stored SIB(s). The NPN capable UE 1*e*-05 may determine whether Condition 5 is satisfied based on the received SIB1, or may determine whether Condition 5 is satisfied based on a higher layer signal.

In operation 1*e*-55, when the NPN capable UE 1*e*-05 determines in operation 1*e*-35 that a current serving cell is a non-NPN-only cell and determines that Condition 5 is not satisfied, the NPN capable UE 1*e*-05 may determine that the SIB(s) stored in operation 1*e*-20 are not valid and may re-obtain corresponding SIB(s) from the current serving cell. According to an embodiment of the disclosure, the re-obtained SIB(s) may be the remaining SIB(s) other than the SIB1 received in operation 1*e*-25.

In operation 1*e*-60, when the NPN capable UE 1E-05 determines in operation 1*e*-30 that Condition 3 is satisfied, the NPN capable UE 1*e*-05 may determine whether a current serving cell is an NPN-only cell. The NPN capable UE 1*e*-05 may determine whether Condition 3 is satisfied based on the received SIB1, or may determine whether Condition 3 is satisfied based on a higher layer signal.

In operation 1*e*-65, when the NPN capable UE 1*e*-05 determines in operation 1*e*-60 that a current serving cell is an NPN-only cell, the NPN capable UE 1E-05 may determine whether Condition 6 is satisfied. The NPN capable UE 1*e*-05 may determine whether Condition 6 is satisfied based on the received SIB1, or may determine whether Condition 6 is satisfied based on a higher layer signal.

Condition 6: If the first NPN identity in the NPN-IdentityInfoList, the cellIdentity and valueTag that are included in the si-SchedulingInfo for the SIB received from the serving cell are identical to the NPN identity, the cellIdentity and the valueTag associated with the stored version of that SIB In operation 1*e*-70, when the NPN capable UE 1*e*-05 determines in operation 1*e*-65 that Condition 6 is satisfied, the NPN capable UE 1*e*-05 determines that the SIB(s) stored in operation 1*e*-20 are valid and does not need to additionally obtain from the current serving cell for the stored SIB(s). According to an embodiment of the disclosure, the SIB(s) may be SIB(s) other than the SIB1 received in operation 1*e*-25.

In operation 1*e*-75, when the NPN capable UE 1*e*-05 determines in operation 1*e*-65 that Condition 6 is not satisfied, the NPN capable UE 1*e*-65 may determine that the SIB(s) stored in operation 1*e*-20 are not valid and may re-obtain corresponding SIB(s) from the current serving cell. The NPN capable UE 1*e*-05 according to the disclosure re-obtains SIB(s) without determining whether Condition 7 is additionally satisfied. According to an embodiment of the disclosure, the SIB(s) may be the remaining SIB(s) other than the SIB1 received in operation 1*e*-25.

Condition 7: If the first PLMN-Identity in the PLMN-IdentityInfoList, the cellIdentity and valueTag that are included in the si-SchedulingInfo for the SIB received from the serving cell are identical to the PLMN-Identity, the cellIdentity and the valueTag associated with the stored version of that SIB In operation 1*e*-80, when the NPN capable UE 1*e*-05 determines in operation 1*e*-60 that a current serving cell is a non-NPN-only cell and determines that Condition 7 is satisfied, the NPN capable UE 1*e*-05 determines that the SIB(s) stored in operation 1*e*-20 are valid and does not additionally obtain from the current serving cell for the stored SIB(s). In operation 1*e*-80, when the NPN capable UE 1*e*-05 determines in operation 1*e*-60 that a current serving cell is a non-NPN-only cell and determines that Condition 7 is not satisfied, the NPN capable UE 1*e*-05 may determine that the SIB(s) stored in operation 1*e*-20 are not valid and may re-obtain corresponding SIB(s) from the current serving cell.

The operations of FIG. 1E described above do not have to be performed sequentially. Omitting each operation and changing the order of performing operations are obvious to one of ordinary skill in the art.

Figure 1F:
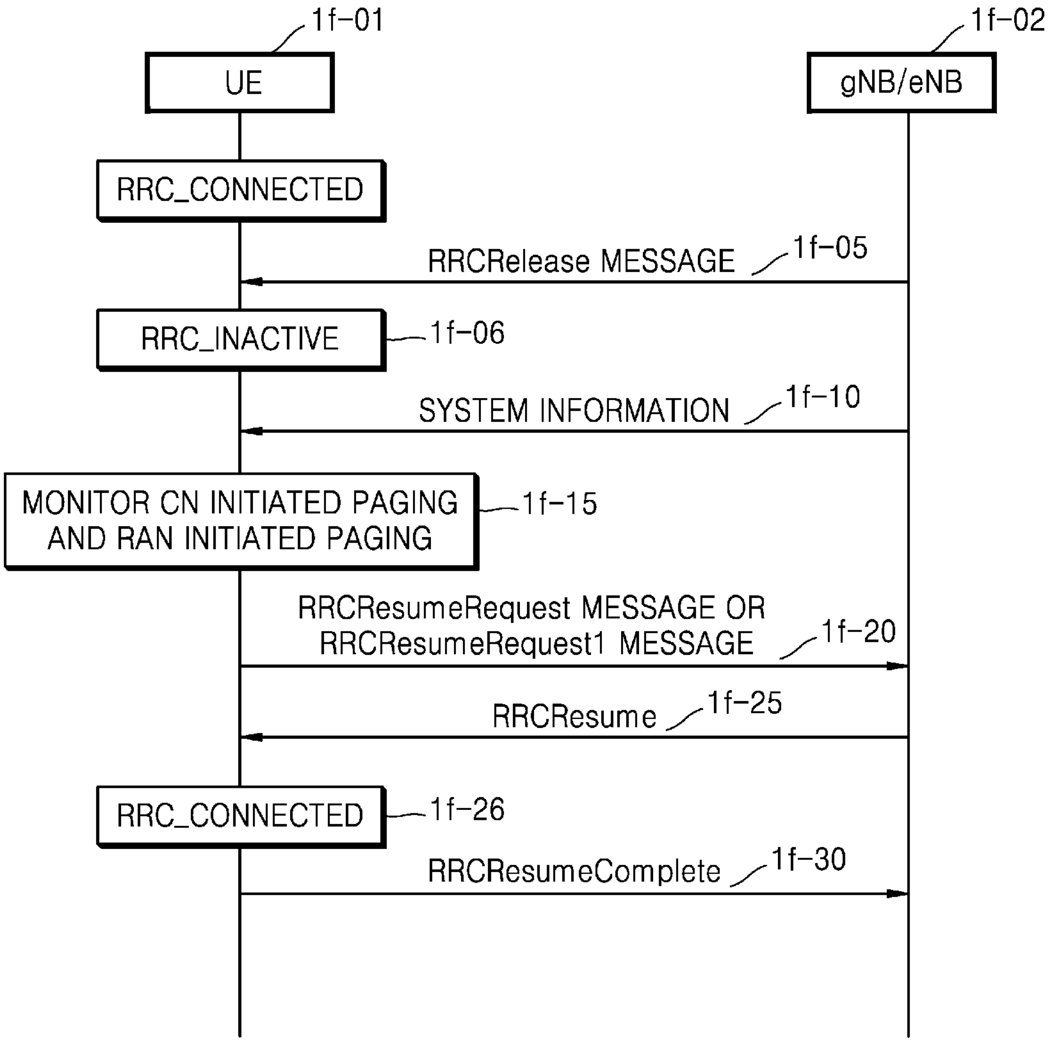
FIG. 1F is a diagram illustrating an operation in which a UE in an RRC_idle mode or an RRC_inactive mode monitors a paging occasion according to a discontinuous reception (DRX) cycle, according to an embodiment of the disclosure.

FIG. 1F is a diagram for describing a procedure in which a base station releases a connection with a UE and the UE switches from an RRC_connected mode to an RRC_inactive mode and a procedure in which the UE resumes a connection with the base station and switches from the RRC_inactive mode to the RRC_connected mode, according to an embodiment of the disclosure.

Referring to FIG. 1F, a UE 1*f*-01 may be in an RRC_connected mode by establishing an RRC connection with a gNB/eNB 1*f*-02. When the UE has not transmitted or received data for some reason or for a certain period of time in the RRC_connected mode, the gNB/eNB may transmit an RRC connection release message (RRCRelease message) that includes suspend configuration information (suspendConfig) to the UE (1*f*-05) so that the UE switches to an RRC_inactive mode (1*f*-06).

When the UE receives the RRC connection release message including the suspend configuration information from the gNB/eNB, a series of operations of the UE proposed are as follows.

The UE may apply the received suspend configuration information (suspendConfig). The suspend configuration information may include the following parameters. However, the parameters of the suspend configuration information are not limited thereto.

Full UE connection resume identifier (fullI-RNTI): When useFullResumeID is signaled in an SIB1 broadcast by a cell to which the UE is to resume a connection later through a cell selection/reselection procedure, the UE may transmit an RRCResumeRequest1 message to the cell to which the UE is to resume a connection later. That is, the UE may set resumeIdentity to an I-RNTI value and may transmit the RRCResumeRequest1 message to the cell to which the UE is to resume a connection later The fullI-RNTI should always be included in the suspend configuration information.

Short UE connection resume identifier (ShortI-RNTI): When the useFullResumeID is not signaled to the SIB1 broadcast by the cell to which the UE is to resume a connection later through a cell selection/reselection procedure, the UE may transmit an RRCResumeRequest message to the cell to which the UE is to resume a connection later. That is, the UE may set resumeIdentity to a ShortI-RNTI value and may transmit the RRCResumeRequest message to the cell to which the UE is to resume a connection later. The ShortI-RNTI should always be included in the suspend configuration information.

ran paging cycle (ran-PagingCycle): The UE in the RRC_inactive mode may monitor RAN-initiated paging by applying a value included in the ran-PagingCycle field. When the RAN-initiated paging is received, the UE may perform an RRC connection resume procedure with the gNB/eNB. The ran-PagingCycle may have one of the following values {rf32, rf64, rf128, rf256}, where rf32 denotes a length of 32 radio frames. That is, rf32 refers to 320 ms. The ran-PagingCyle should always be included in the suspend configuration information.

ran paging cycle 2 (ran-PagingCycle2): The UE in the RRC_inactive mode may monitor RAN-initiated paging by applying a value included in a ran-PagingCycle2 field. When the RAN-initiated paging is received, the UE may perform an RRC connection resume procedure with the gNB/eNB. The ran-PagingCycle2 may have one of the following values {rf512, rf1024}, where rf512 denotes a length of 512 radio frames. That is, rf512 refers to 5120 ms. The ran-PagingCyle2 may be included in the suspend configuration information along with the ran-PagingCycle in order for the gNB/eNB to enable the UE in the RRC_inactive mode to apply a longer discontinuous reception mode.

ran-based notification area information (ran-NotificationAreaInfo): The UE in the RRC_inactive mode may perform a RAN notification area update (RNAU) procedure with the cell or gNB/eNB when deviating from a RAN based notification area (RNA) after SIB1 reception.

t380: PeridocRNAU-TimerValue for the UE in the RRC_inactive mode to periodically perform the RNAU procedure may be included. When the PeridocRNAU-TimerValue is included, the UE may set a value to the PeridocRNAU-TimerValue and may start a T380 timer. And, when the T380 timer expires, the UE may perform the RNAU procedure with the gNB/eNB.

nextHopChaingCount: The UE in the RRC_inactive mode may update a security key ($K_{gNB}$ key) and parameters related thereto, by using NextHopChainingCount. The nextHopChaingCount should always be included in the suspend configuration information.

The UE may reset a media access control (MAC) layer device. This is to prevent data stored in a hybrid automatic repeat and request (HARQ) buffer from being unnecessarily retransmitted when a connection is resumed.

The UE may re-establish radio link control (RLC) layer devices for SRB1. This is to, when a connection is resumed, prevent data stored in an RLC buffer from being unnecessarily retransmitted and to initiate variables for future use.

The UE may store UE inactive AS context. The UE inactive AS context may refer to configured suspend configuration information, a current security key ($K_{gNB}$ key and/or $K_{RRCint}$ key), an ROHC state, a UE cell identifier (C-RNTI) that was used in a source cell (source PCell), a cell identity (cellIdentity) and physical cell identity) of the source cell, or other parameters configured except ReconfigurationWithSync.

The UE may suspend all signaling radio bearers (SRBs) and data radio bearers (DRBs) except SRB0.

The UE may indicate PDCP suspension to lower layer devices for all DRBs.

When t380 is included in the received suspend configuration information, the UE may set a timer value to t380 and may start the T380 timer.

When waitTime is included in the RRC connection release message, the UE may set a timer value to waitTime and may start a T320 timer. Also, the UE may notify a higher layer device that access barring is applicable to all access categories, excluding access categories '0' and '2'.

The UE may switch to the RRC_inactive mode (**1*f*-06**) and perform a cell selection procedure.

The UE **1*f*-01 switching to the RRC_inactive mode performs the cell selection procedure or cell reselection procedure, and may search for and camp on a suitable cell to receive system information (1*f*-10**).

In operation 1F-15, the UE in the RRC_inactive mode may monitor core network (CN) initiated paging and radio access network (RAN) initiated paging. When the UE receives the CN initiated paging, the UE may switch to an RRC_idle mode and may notify the reception to a NAS. When the UE receives the RAN initiated paging, the UE may perform the RRC connection resume procedure with the gNB/eNB. When the UE performs a random access procedure with the gNB/eNB and transmits an RRC message to the gNB/eNB, operations of the UE proposed are as follows (**1*f*-20**).

1. When the useFullResumeID field is signaled in the system information (SIB1), the UE may select RRCResumeRequest1 as a message to be transmitted to the gNB/eNB. The UE may prepare to transmit the stored full UE connection resume identifier (fullI-RNTI) value as the resumeIdentity in the RRCResumeRequest1 message. Otherwise, the UE may select RRCResumeRequest as a message to be transmitted to the gNB/eNB. The UE may prepare to transmit the stored split UE connection resume identifier (shortI-RNTI) value as the shortResumeIdentity in the RRCResumeRequest message.

2. The UE may select a cause of resuming a connection to be 'mt-Access'.

3. The UE may reconstruct RRC configuration information and security context information from the UE inactive AS context stored excluding cell group configuration information (cellGroupConfig).

4. The UE may calculate MAC-I and may prepare to transmit last 16 bits of the MAC-I in a resumeMAC-I field of the selected message.

5. The UE may newly update a KgNB security key based on a current kgNB security key, a NextHop (NH) value, and a stored NCC value.

6, The UE may derive new security keys K_RRCenc, K_RRC_int, K_UPint, and K_UPenc to be used in an integrity protection and verification procedure and an encryption and decryption procedure by using the newly updated KgNB security key.

7. Also, the UE may resume the integrity protection and verification procedure by applying, on all bearers excluding SRB0, updated security keys and a pre-configured algorithm, and may apply integrity verification and protection to data subsequently transmitted and received. This is to increase the reliability and security of the subsequent data transmitted and received from the SRB1 or DRBs.

8. Also, the UE may resume the encoding and decoding procedure by applying, on all bearers excluding SRB0, the updated security keys and the pre-configured algorithm, and may apply encoding and decoding to data subsequently transmitted and received. This is to increase the reliability and security of the subsequent data transmitted and received from the SRB1 or DRBs.

9. The UE may reconstruct a PDCP state and re-establish PDCP entities for the SRB1.

10. The UE may resume the SRB1. This is to receive an RRCResume message via the SRB1 in response t to the RRCResumeRequest message or RRCResumeRequest1 message for transmission.

11. The UE may configure a message selected for transmission to the gNB/eNB, i.e., the RRCResumeRequest message or RRCResumeRequest1 message, and may deliver the same to lower layer devices.

12. The UE may start a T319 timer when transmitting the RRCResumeRequest message or RRCResumeRequest1 message to the gNB/eNB.

In operation 1*f*-25, when the UE in the RRC_inactive mode receives the RRC connection resume message (RRCResume message), operations of the UE proposed are as follows.

1. The UE may stop running the T319 timer when the RRCResumeRequest message or RRCResumeRequest1 message is transmitted to the gNB/eNB.

When the RRCResume message includes full configuration information (fullConfig), the UE performs a full configuration procedure. Otherwise, when the UE receives an RRCResume message, the UE reconstructs a PDCP state and resets a COUNT value for SRB2 and all the DRBs. Also, the UE reconstructs cell group configuration information (cellGroupConfig) from stored UE context. The UE indicates the reconstruction to lower layer devices.

3, The UE releases the full UE connection resume identifier (FullI-RNTI), the split UE connection resume identifier (ShortI-RNTI), and the stored UE context. Here, the UE does not release the RAN notification area information (ran-NotificationAreaInfo).

4.—When the RRCResume message includes master cell group (masterCellGroup) configuration information, the UE may perform a cell group configuration procedure according to the master cell group configuration information.

5.—When the RRCResume message includes bearer configuration information (radioBearerConfig), the UE may configure a bearer according to the bearer configuration information.

6. The UE may resume the SRB2 and all the DRBs.

7. The UE discards stored cell reselection priority information when there is the cell re-section priority information stored. The cell reselection priority information may be information that is stored from CellReselectionPriorities that may be included in the RRCRelease message, or that is taken over from another RAT.

8. When the T320 timer is running, the UE may stope the T320 timer.

9.—When the RRCResume message includes frequency measurement configuration information (measConfig), the UE may perform frequency measurement according to the configuration information.

10.—When the RRC connection is suspended, the UE may resume the frequency measurement.

11. The UE may switch to the RRC_connected mode. (1*f*-26).

12. The UE may indicate higher layer devices that the suspended RRC connection is resumed.

13. The UE may stop the cell reselection procedure.

14. The UE may consider the currently accessed cell as a primary cell (PCell).

15. For transmission to lower layer devices, an RRC connection resume completion message (RRCResumeComplete) may be configured and delivered as follows. (1*f*-30).

When higher layer devices provide an NAS PDU, the NAS PDU may be included in a dedicatedNAS-Message.

The operations of FIG. 1F described above do not have to be performed sequentially. Omitting each operation and changing the order of performing operations are obvious to one of ordinary skill in the art.

Figure 1G:
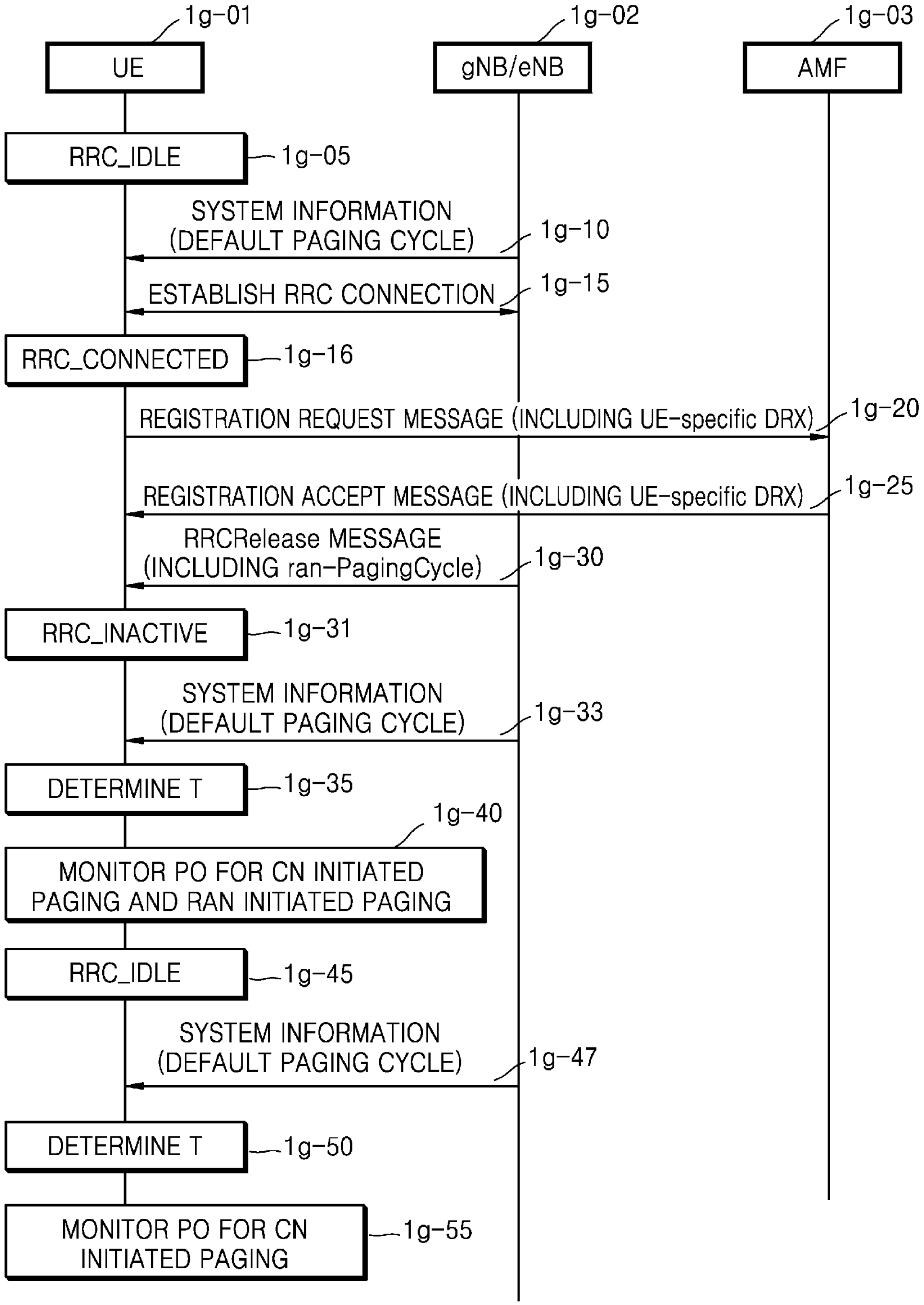
FIG. 1G is a diagram illustrating an operation in which a UE in an RRC_idle mode or an RRC_inactive mode monitors a paging occasion according to a DRX cycle, according to an embodiment of the disclosure.

FIG. 1G is a diagram illustrating an operation in which a UE in an RRC_idle mode or an RRC_inactive mode monitors a paging occasion according to a discontinuous reception (DRX) cycle, according to an embodiment of the disclosure.

Discontinuous reception (DRX) may be a technology for reducing power consumption of the UE in the RRC_idle mode or the RRC_inactive mode. The UE may perform a reception operation to receive a paging signal from a base station.

According to an embodiment of the disclosure, the paging signal may refer to a paging message, or may refer to a short message (an indicator indicating that system information has changed or an indicator indicating ETWS or CMAS notification). However, because the paging signal is not frequently transmitted, when the UE continues the reception operation even while the paging signal is not transmitted, power loss increases. Accordingly, reception of the paging signal may be attempted periodically only at particular timings in order to reduce power consumption, which corresponds to DRX. Also, the paging timing is referred to as a paging occasion (PO). According to an embodiment of the disclosure, the PO may refer to a set of PDCCH monitoring occasions, and may include a plurality of time slots (e.g., a slot may be a sub-frame or an OFDM symbol) in which paging DCI is transmitted.

Referring to FIG. 7, a UE 1*g*-01 may be in an RRC_idle mode (1*g*-05).

In operation 1*g*-10, the UE 1*g*-01 in the RRC_idle mode may receive certain system information from a gNB/eNB 1*g*-02. The system information may include a default paging cycle value (default DRX value). For example, the default paging cycle value may be included in an SIB1 for NR, and in LTE, and the default paging cycle value may be included in an SIB2 for LTE. The default paging cycle may be signaled as one of the following values {rf32, rf64, rf128, rf256}. rf32 denotes a length of 32 radio frames. That is, rf32 refers to 320 ms.

In operation 1*g*-15, the UE 1*g*-01 in the RRC_idle mode may establish an RRC connection with the gNB/eNB 1*g*-02, and may switch to an RRC_connected mode (1*g*-16).

Operation 1*g*-20 and operation 1*g*-25 may be performed when the UE 1*g*-01 in the RRC_connected mode has a desired DRX cycle value (UE-specific DRX value). In detail, the UE may be allocated the desired DRX cycle value from an AMF 1*g*-03 through a registration process with the AMF 1*g*-03. For example, the UE 1*g*-01 may include the DRX (UE-specific DRX value) desired by the UE 1*g*-01 in a registration request message and may transmit the registration request message to the AMF 1*g*-03 (1*g*-20), and the AMF 1*g*-03 may provide a registration accept message in the DRX cycle (UE-specific DRX value) desired by the UE 1*g*-01 (1*g*-25). The UE-specific DRX value may be one of the following values {rf32, rf64, rf128, rf256}.

In operation 1*g*-30, the gNB/eNB 1*g*-02 may transmit an RRC connection release message (RRCRelease) including suspendConfig to the UE 1*g*-01 in the RRC_connected mode. The suspendConfig may include ran-PagingCycle. The UE 1*g*-01 receiving the RRC connection release message may switch to an RRC_inactive mode (1*g*-31).

In operation 1*g*-33, the UE 1*g*-01 in the RRC_inactive mode may receive certain system information from the gNB/eNB 1*g*-02. The system information may include a default paging cycle value (default DRX value).

In operation 1*g*-35, the UE 1*g*-01 in the RRC_inactive mode may determine that a shortest value from among the default DRX value broadcast in the system information, the DRX value signaled in the ran-PagingCycle, and the UE-specific DRX value allocated from a higher layer device is the DRX cycle T. When the UE-specific DRX value is not allocated from the higher layer device (e.g., when operation 1*g*-20 and operation 1*g*-25 are not performed), the UE 1*g*-01 in the RRC_inactive mode may determine that a shorter value from among the DRX value signaled in the ran-PagingCycle and the default DRX value broadcast in the system information is the DRX cycle T.

In operation 1*g*-40, the UE 1*g*-01 in the RRC_inactive mode may monitor a paging occasion according to the T determined in operation 1*g*-35. The UE 1*g*-01 may monitor a paging occasion and may receive CN initiated paging and RAN initiated paging. In detail, the UE 1*g*-01 may monitor a paging occasion according to the DRX through Equations 1 and 2 below. A system frame number (SFM) may increase by 1 for each radio frame. When a paging signal is transmitted in a radio frame satisfying Equation 1, the UE 1*g*-01 may perform a reception operation by using the DRX. The radio frame in which the paging signal is transmitted is referred to as a paging frame (PF). A PF may include one or more POs, or may include starting points of POs (firstPDCCH-MonitoringOccasionOfPO). A PO involved in a PF may start in the PF, or may start in a radio frame after the PF.

calculation of $PF$ for paging signal ⟨Equation 1⟩

$$(SFN+\mathrm{PF\_offset}) \bmod T = (T \text{ div } N) * (\mathrm{UE\_ID} \bmod N)$$

calculation of $PO$ for paging signal ⟨Equation 2⟩

$$\mathrm{i\_s} = \mathrm{floor}(\mathrm{UE\_ID}/N) \bmod Ns \text{ in Equations 1 and 2,}$$

SFN: System Frame Number. 10 bits (The most significant bit (MSB) of the 10-bit SFN is in systemFrameNumber in MIB and the 4 LSB of the SFN are conveyed in the PBCH transport block as part of channel coding).

T: DRX cycle of the UE

N: number of total paging frames in T

Ns: number of paging occasions for a PF. ENUMERATED {four, two, one}

PF_offset: offset used for PF determination

UE_ID: 5G-S-TMSI mod 1024

Values of Ns, nAndPagingFrameOffset, and default DRX Cycle may be provided in the SIB1. The UE 1*g*-01 may derive the parameters N and PF_offset from nAndPagingFrameOffset. When the UE has no 5G-S-TMSI, the UE may derive PF and i_s by setting UE_ID in Equations 1 and 2 to 0.

Also, PDCCH monitoring occasions for the paging signal may be determined according to pagingSearchSpace and firstPDCCH-MonitoringOccasionOfPO. For example, when SearchSpaceId in pagingSearchSpace is set to 0, PDCCH monitoring occasions for the paging signal may be the same as RMSI (or SIB1) defined in Chapter 13 of 3GPP TS 38.213.

In detail, when SearchSpaceId in pagingSearchSpace is set to 0, an Ns value may be 1 or 2. When Ns is 1, only one PO may exist in a PF, and the PO may start in a first PDCCH monitoring occasion. When Ns is 2, one PO may exist in a PF, and a PO may exist in the first half frame of the PF when i_s derived according to Equation 2 is 0 and a PO may exist in the second half frame of the PF when i_s derived according to Equation 2 is 1. When SearchSpaceId other than 0 is configured for pagingSearchSpace, the UE 1*g*-01 may monitor a $(\mathrm{i\_s}+1)^{th}$ PO by using an i_s value derived according to Equation 2.

In this case, a PO is a set of 'S' consecutive PDCCH monitoring occasions where 'S' is the number of actual transmitted SSBs determined according to ssb-PositionsInBurst in SIB1.

Also, a $K^{th}$ PDCCH monitoring occasion for paging in the PO may correspond to a $K^{th}$ transmitted SSB. In addition, the PDCCH monitoring occasions for paging which do not overlap with UL symbols may be sequentially numbered from zero starting from the first PDCCH monitoring occasion in the PF.

Also, when firstPDCCH-MonitoringOccasionOfPO is present, the starting PDCCH monitoring occasion number of $(\mathrm{i\_s}+1)^{th}$ PO may be the $(\mathrm{i\_s}+1)^{th}$ value of the firstPDCCH-MonitoringOccasionOfPO parameter. When firstPDCCH-MonitoringOcassionofPO is not signaled, a starting point of PDCCH monitoring in the $(\mathrm{i\_s}+1)^{th}$ PO may be equal to i_s*S.

In operation 1*g*-45, the UE 1*g*-01 in the RRC_inactive mode may switch to an RRC_idle mode when a certain event occurs. The certain event may refer to a case where an NR cell is selected or reselected while a t319 timer is running.

In operation 1*g*-47, the UE 1*g*-02 in the RRC_idle mode may receive certain system information from the gNB/eNB 1*g*-02. The system information may include a default paging cycle value (default DRX value).

In operation 1*g*-50, the UE 1*g*-01 in the RRC_idle mode may determine that a shortest value from among the default DRX value broadcast in the system information and the UE-specific DRX value allocated from a higher layer device is the DRX cycle T. When the UE-specific value is not allocated from the higher layer device (e.g., when operation 1*g*-20 and operation 1*g*-25 are not performed), the UE in the RRC_idle mode may determine that the default DRX value broadcast in the system information is the DRX cycle T.

In operation 1*g*-55, the UE 1*g*-01 in the RRC_idle mode may monitor a paging occasion according to the T determined in operation 1*g*-50. The UE may monitor a paging occasion and may receive CN initiated paging. In detail, the UE may monitor a paging occasion according to the DRX through Equations 1 and 2.

The UE in the RRC_inactive mode according to the disclosure may not receive CN initiated paging by monitoring a paging occasion in operation 1*g*-40. In detail, this is because the gNB/eNB matches CN initiated paging to a paging occasion of the UE in the RRC_idle mode, but a paging occasion of the UE in the RRC_inactive mode and the paging occasion of the UE in the RRC_idle mode may not be the same. For example, according to configuration information of Table 1, an i_s value derived from Equation 2 may vary according to an RRC state of the UE, which will be described with reference to FIG. 1H.

TABLE 1

| | |
|---|---|
| Example of configuration | RAN paging cycle: 32rf<br>Default paging cycle: 64rf<br>N: T/16<br>Ns: 4<br>PF_offset: 14<br>UE_ID: 5G-S-TMSI mod 1024 = 3 |
| RRC_INACTIVE | PF: 2 34 66 98130 162 194 226 258 290 322 354 386 418 450<br>i_s = 1 |
| RRC_IDLE | PF: 34 98 162 226 290 354 418<br>i_s = 0 |

Figure 1H:
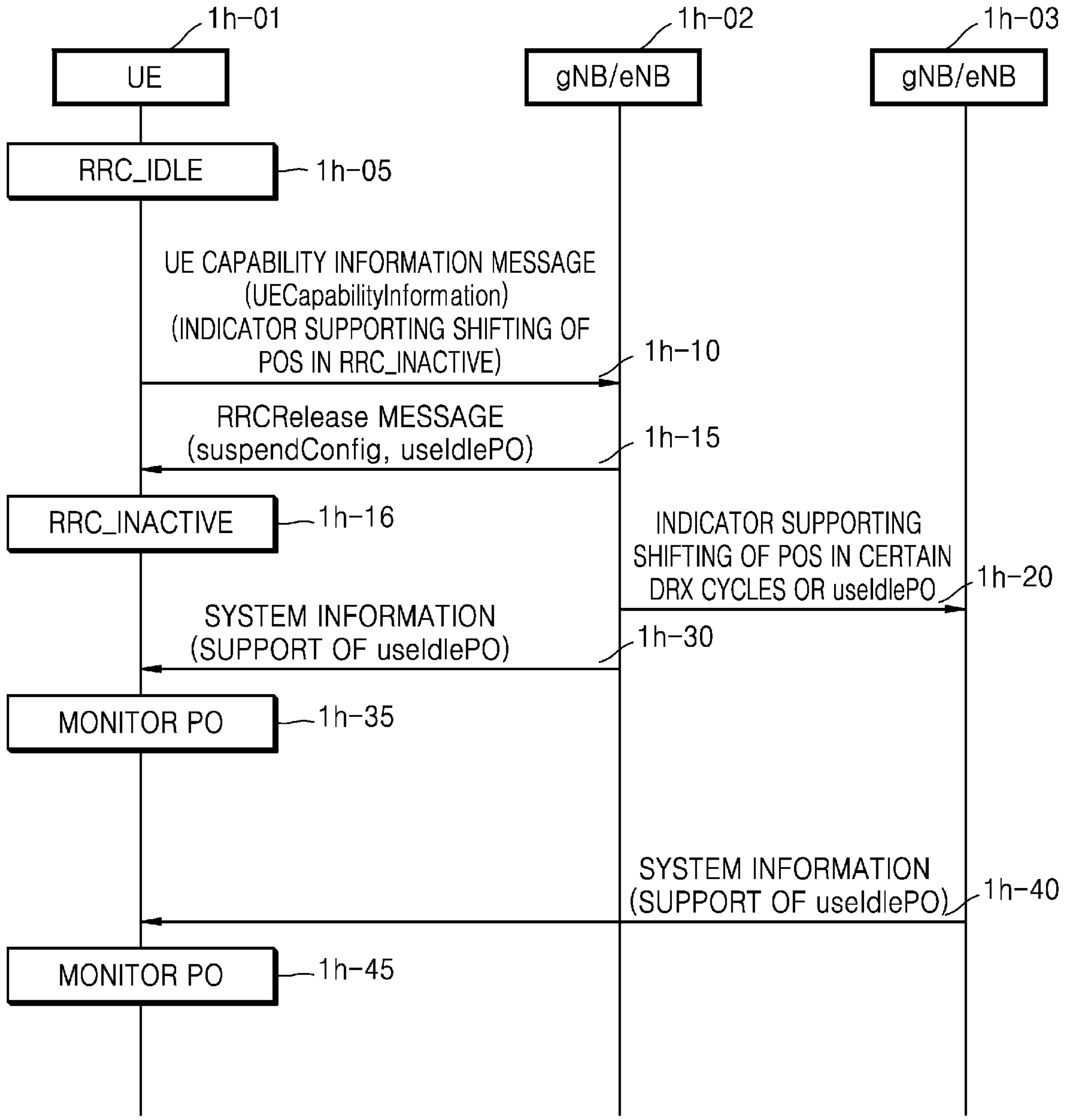
FIG. 1H is a diagram illustrating an operation in which a UE in an RRC_inactive mode monitors a modified paging occasion according to a DRX cycle, according to an embodiment of the disclosure.

The operations of FIG. 1G described above do not have to be performed sequentially. Omitting each operation and changing the order of performing operations are obvious to one of ordinary skill in the art. FIG. 1H is a diagram illustrating an operation in which a UE in an RRC_inactive mode monitors a modified paging occasion according to a discontinuous reception (DRX) cycle, according to an embodiment of the disclosure.

In the disclosure, Equations 1 and 2 of the above embodiment may be used. However, the disclosure proposes a method of deriving an i_s value differently from the above embodiment when a specific condition is satisfied.

calculation of $PF$ for paging signal ⟨Equation 1⟩

$$(SFN+\text{PF\_offset})\bmod T=(T\ div\ N)*(\text{UE\_ID}\bmod N)$$

calculation of $PO$ for paging signal ⟨Equation 2⟩

$$\text{i\_s}=\text{floor}(\text{UE\_ID}/N)\bmod Ns$$

Referring to FIG. 1H, a UE 1*h*-01 may establish an RRC connection with a gNB/eNB 1*h*-02 and may enter an RRC_connected mode, in operation 1*h*-05.

In operation 1*h*-10, the UE 1*h*-01 in the RRC_connected mode may transmit a UE capability information message (UECapabilityInformation) to the gNB/eNB 1*h*-02. The UE capability information message may include at least one of the following indicators.

- Indicator indicating that when PF values derived by the UE through Equation 1 in an RRC_inactive mode and an RRC_idle mode are the same but i_s values derived by the UE through Equation 2 are different (i.e., when RAN paging and CN paging do not overlap), the UE in the RRC_inactive mode may monitor a PO by applying an i_s value of the RRC_idle mode to a PO associated with a corresponding PF
- Indicator indicating that when Condition A below is satisfied, the UE 1*h*-01 in the RRC_inactive mode may apply at least one of Rule 1 and Rule 2
  - Condition A: DRX cycle configured by RAN (e.g. ran-PagingCycle)<min (UE-specific DRX cycle, default DRX cycle) or Ns>1 or DRX cycle configured by RAN (e.g. ran-PagingCycle)<min (UE-specific DRX cycle, default DRX cycle) and Ns>1
  - Rule 1: i_s=floor (UE_ID/N) mod Ns; N is determined based on T=min (DRX cycle configured by RAN (e.g. ran-PagingCycle), UE-specific DRX cycle, default DRX cycle)
  - Rule 2: i_s=floor (UE_ID/N) mod Ns; N is determined based on T=min (UE-specific DRX cycle, default DRX cycle)

In operation 1*h*-15, the gNB/eNB 1*h*-02 may transmit an RRC connection release message (RRCRelease) including suspendConfig to the UE 1*h*-01 in the RRC_connected mode. In the disclosure, a useIdlePO indicator may be included in the RRC connection release message. The useIdlePO indicator may be an indicator indicating that when PF values derived through Equation 1 are the same but i_s values derived through Equation 2 are different (i.e., when RAN paging and CN paging do not overlap), the UE in the RRC_inactive mode should monitor a PO by applying an i_s value of the RRC_idle mode to a PO associated with a corresponding PF. Alternatively, the useIdlePO indicator may be an indicator to derive a PO by applying at least one of the above rules when Condition A is satisfied in operation 1*h*-10. The useIdlePO indicator may be included in the RRC connection release message only for the gNB/eNB 1*h*-02 capable of interpreting the indicator in operation 1*h*-10. The UE 1*h*-01 may store the useIdlePO indicator, and may switch to an RRC_inactive mode (1*h*-16).

In operation 1*h*-20, the gNB/eNB 1*h*-02 may transmit the indicator described in operation 1*h*-10 to another gNB/eNB 1*h*-03 or may transmit the useIdlePO indicator in operation 1*h*-15. The reason for performing operation 1*h*-20 is to let the other gNB/eNB 1*h*-03 know whether to transmit a paging signal to the UE 1*h*-01 in the RRC_inactive mode at a modified paging occasion. For reference, the order of operation 1*h*-15 and operation 1*h*-20 may be changed.

I operation 1*h*-30, the UE 1*h*-01 in the RRC_inactive mode may receive certain system information from the gNB/eNB 1*h*-02. The system information may include an indicator indicating that the cell or the gNB/eNB supports the useIdlePO. That is, the indicator indicating that the useIdlePO is supported may mean that when RAN paging and CN paging do not overlap, the cell or the gNB/eNB transmits, to the UE in the RRC_inactive mode, a paging signal at a PO in which an i_s value of the RRC_idle mode is applied to a PO associated with a corresponding PF.

In operation 1*h*-35, the UE 1*h*-01 in the RRC_inactive mode may monitor a paging occasion. When the useIdlePO indicator is included in the RRCRelease message received in operation 1*h*-15, or the useIdlePO indicator is included in the RRCRelease message received in operation 1*h*-15 and the indicator indicating that the useIdlePO is supported is broadcast in the system information received in operation 1*h*-30, if PF values derived through Equation 1 are the same but i_s values derived through Equation 2 are different (i.e., RAN paging and CN paging do not overlap), the UE in the RRC_inactive mode may monitor a paging occasion by applying an i_s value of the RRC_idle mode to a PO associated with a corresponding PF.

Alternatively, when the useIdlePO indicator is included in the RRCRelease message received in operation 1*h*-15, or the useIdlePO indicator is included in the RRCRelease message received in operation 1*h*-15 and the indicator indicating that the useIdlePO is supported is broadcast in the system information received in operation 1h-30, if Condition A is satisfied, the UE 1h-01 may monitor a paging occasion by deriving an i_s value by applying Rule 1 or Rule 2.

In operation 1h-40, the UE 1h-01 in the RRC_inactive mode may receive system information by reselecting a new gNB/eNB or cell 1h-03.

In operation 1h-45, the UE 1h-01 in the RRC_inactive mode may monitor a paging occasion. When the useIdlePO indicator is included in the RRCRelease message received in operation 1h-15, or the useIdlePO indicator is included in the RRCRelease message received in operation 1h-15 and the indicator indicating that the useIdlePO is supported is broadcast in the system information received in operation 1h-40, if PF values derived through Equation 1 are the same but i_s values derived through Equation 2 are different (i.e., RAN paging and CN paging do not overlap), the UE in the RRC_inactive mode may monitor a paging occasion by applying an i_s value of the RRC_idle mode to a PO associated with a corresponding to PF.

Alternatively, when the useIdlePO indicator is included in the RRCRelease message received in operation 1h-15, or the useIdlePO indicator is included in the RRCRelease message received in operation 1h-15 and the indicator indicating that the useIdlePO is supported is broadcast in the system information received in operation 1h-40, if Condition A is satisfied, the UE 1h-01 may monitor a paging occasion by deriving an i_s value by applying Rule 1 or Rule 2.

For reference, in the disclosure, even when the gNB/eNB 1h-02 transmits an RRCReject message to the UE 1h-01, a useIdlePO may be included.

The operations of FIG. 1H described above do not have to be performed sequentially. Omitting each operation and changing the order of performing operations are obvious to one of ordinary skill in the art.

Figure 1I:
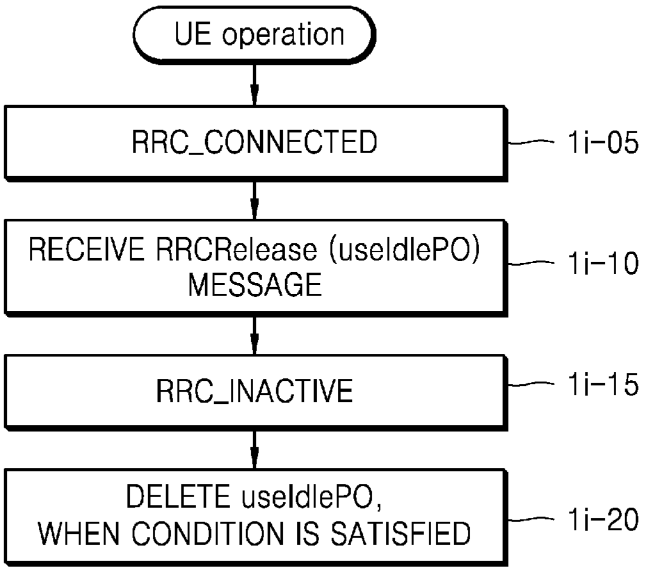
FIG. 1I is a flowchart illustrating a UE operation in which a UE in an RRC_inactive mode releases configured useIdlePO from an RRC connection release message, according to an embodiment of the disclosure.

FIG. 1I is a flowchart illustrating a UE operation in which a UE in an RRC_inactive mode releases configured useIdlePO from an RRC connection release message, according to an embodiment of the disclosure.

Referring to FIG. 9, a UE may be in an RRC_connected mode (1i-05).

In operation 1i-10, the UE may receive an RRC connection release message (RRCRelease) from a base station. The RRC connection release message may include suspendConfig and useIdlePO.

In operation 1i-15, the UE may apply the received RRCRelease and may switch to an RRC_inactive mode. The UE in the RRC_inactive mode may store the useIdlePO.

In operation 1i-20, when a certain condition is satisfied, the UE in the RRC_inactive mode may release or delete the stored useIdlePO. The certain condition may refer to at least one of the following conditions.

Condition:

- When switching from RRC_inactive mode to RRC_idle mode
- When switching from RRC_inactive mode to RRC_connected mode
- When a PLMN selection or SNPN selection is performed on request by NAS The operations of FIG. 1I described above do not have to be performed sequentially. Omitting each operation and changing the order of performing operations are obvious to one of ordinary skill in the art.

Figure 1J:
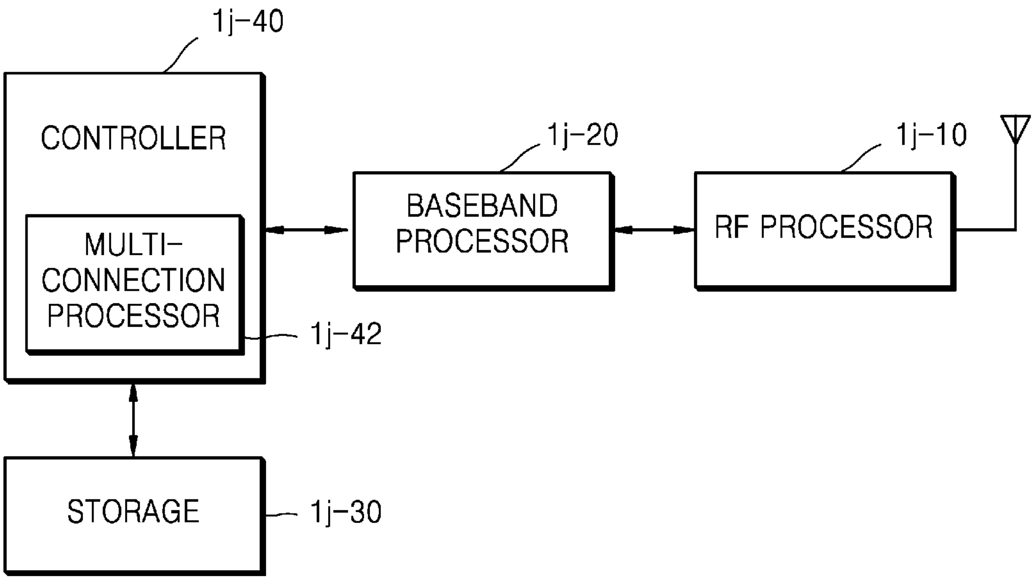
FIG. 1J is a block diagram illustrating an internal structure of a UE, according to an embodiment of the disclosure.

FIG. 1J is a block diagram illustrating an internal structure of a UE, according to an embodiment of the disclosure.

A UE may include a radio frequency (RF) processor 1j-10, a baseband processor 1j-20, a storage 1j-30, and a controller 1j-40. However, the disclosure is not limited to the above example, and the UE may include fewer elements or more elements than the elements shown in FIG. 1J.

According to an embodiment of the disclosure, the RF processor 1j-10 may perform a function of transmitting/receiving a signal through a wireless channel such as band conversion and amplification of a signal. That is, the RF processor 1j-10 may up-convert a baseband signal provided from the baseband processor 1j-20 into an RF band signal and transmit the RF band signal through an antenna, and may down-convert an RF band signal received through the antenna into a baseband signal. For example, the RF processor 1j-10 may include a transmission filter, a reception filter, an amplifier, a mixer, an oscillator, a digital-to-analog convertor (DAC), an analog-to-digital convertor (ADC), or the like.

Although only one antenna is illustrated in FIG. 1J, the UE may include a plurality of antennas. Also, the RF processor 1j-10 may include a plurality of RF chains. In addition, the RF processor 1j-10 may perform beamforming. For beamforming, the RF processor 1j-10 may adjust phases and magnitudes of signals transmitted/received through a plurality of antennas or antenna elements. Also, the RF processor 1j-10 may perform multiple-input and multiple-output (MIMO) and may receive multiple layers when performing a MIMO operation.

The baseband processor 1j-20 may perform a conversion function between a baseband signal and a bit string, according to physical layer specifications of a system. For example, during data transmission, the baseband processor 1j-20 may generate complex symbols by encoding and modulating a transmitted bit string. Also, during data reception, the baseband processor 1j-20 may restore a received bit string by demodulating and decoding a baseband signal received from the RF processor 1j-10. For example, according to an orthogonal frequency division multiplexing (OFDM) scheme, during data transmission, the baseband processor 1j-20 may generate complex symbols by encoding and modulating a transmitted bit string, map the complex symbols to subcarriers, and then configure OFDM symbols via an inverse fast Fourier transform (IFFT) operation and cyclic prefix (CP) insertion. Also, during data reception, the baseband processor 1j-20 may divide a baseband signal received from the RF processor 1j-10 into units of OFDM symbols, restore signals mapped to subcarriers through a fast Fourier transform (FFT) operation, and then restore a received bit string through demodulation and decoding.

According to an embodiment of the disclosure, the baseband processor 1j-20 and the RF processor 1j-10 may transmit and receive signals as described above. Accordingly, each of the baseband processor 1j-20 and the RF processor 1j-10 may be referred to as a transmitter, a receiver, a transceiver, or a communicator. In addition, at least one of the baseband processor 1j-20 and the RF processor 1j-10 may include a plurality of communication modules to support a plurality of different radio access technologies. In addition, at least one of the baseband processor 1j-20 and the RF processor 1j-10 may include different communication modules to process signals of different frequency bands. For example, the different radio access technologies may include a wireless local area network (LAN) (e.g., Institute of Electrical And Electronics Engineers (IEEE) 802.11) and a cellular network (e.g., LTE). Also, the different frequency bands may include a super high frequency (SHF) (e.g., 2.5 GHz or 5 Ghz) band and a millimeter (mm) wave (e.g., 60 GHz) band. The UE may transmit/receive a signal to/from a base station by using the baseband processor 1_j_-20 and the RF processor 1_j_-10, and the signal may include control information and data.

According to an embodiment of the disclosure, the storage 1_j_-30 may store data such as basic programs for an operation of the UE, application programs, configuration information, and the like. In particular, the storage 1_j_-30 may store information related to a second access node performing wireless communication by using a second radio access technology. Also, the storage 1_j_-30 provides stored data according to a request from the controller 1_j_-40. The storage 1_j_-30 may include a storage medium, such as a read-only memory (ROM), a random-access memory (RAM), a hard disk, compact disc-ROM (CD-ROM), or a digital versatile disk (DVD), or a combination thereof. Also, the storage 1_j_-30 may include a plurality of memories. According to an embodiment, the storage 1_j_-30 may store a program for performing a method for providing vehicle communication.

The controller 1_j_-40 may control overall operations of the UE. For example, the controller 1_j_-40 may transmit/receive signals through the baseband processor 1_j_-20 and the RF processor 1_j_-10. Also, the controller 1_j_-40 may record and read data to and from the storage 1_j_-40. To this end, the controller 1_j_-40 may include at least one processor. For example, the controller 1_j_-40 may include a communication processor (CP) for performing control for communication and an application processor (AP) for controlling a higher layer such as an application program. Also, at least one component in the UE may be implemented as one chip. Also, according to an embodiment of the disclosure, the controller 1_j_-40 may include a multi-connection processor 1_j_-42 for performing an operation in a multi-connection mode.

According to an embodiment of the disclosure, the controller 1_j_-40 may control each element of the UE to perform a method of determining validity of system information. Furthermore, each element of the UE may operate to perform the above-described embodiments of the disclosure.

Figure 1K:
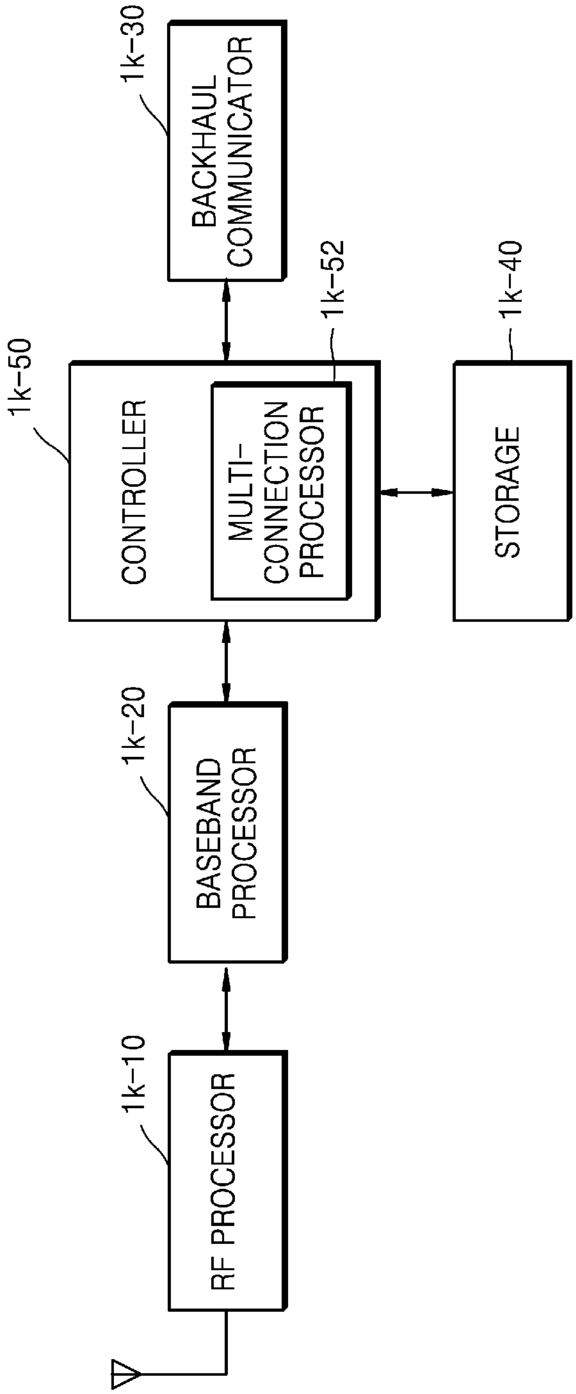
FIG. 1K is a block diagram illustrating a configuration of a new radio (NR) base station, according to an embodiment of the disclosure.

FIG. 1K is a block diagram illustrating a structure of an NR base station, according to an embodiment of the disclosure.

A base station according to an embodiment of the disclosure may include at least one transmission reception point (TRP). According to an embodiment of the disclosure, the base station may include an RF processor 1_k_-10, a baseband processor 1_k_-20, a backhaul communication unit 1_k_-30, a storage 1_k_-40, and a controller 1_k_-50. However, the disclosure is not limited to the above example, and the base station may include fewer elements or more elements than the elements illustrated in FIG. 1K.

According to an embodiment of the disclosure, the RF processor 1_k_-10 may perform a function of transmitting/receiving a signal through a wireless channel such as band conversion and amplification of a signal. That is, the RF processor 1_k_-10 may up-convert a baseband signal provided from the baseband processor 1_k_-20 into an RF band signal and transmit the RF band signal through an antenna, and may down-convert an RF band signal received through the antenna into a baseband signal. For example, the RF processor 1_k_-10 may include a transmission filter, a reception filter, an amplifier, a mixer, an oscillator, a DAC, an ADC, or the like. Although only one antenna is illustrated in FIG. 1K, the base station may include a plurality of antennas. Also, the RF processor 1_k_-10 may include a plurality of RF chains. In addition, the RF processor 1_k_-10 may perform beamforming. For beamforming, the RF processor 1_k_-10 may adjust phases and magnitudes of signals transmitted/received via a plurality of antennas or antenna elements. The RF processor 1_k_-10 may perform a DL MIMO operation by transmitting one or more layers.

The baseband processor 1_k_-20 may perform a conversion function between a baseband signal and a bit string, according to physical layer specifications of a certain radio access technology. For example, during data transmission, the baseband processor 1_k_-20 may generate complex symbols by encoding and modulating a transmitted bit string. Also, during data reception, the baseband processor 1_k_-20 may restore a received bit string by demodulating and decoding a baseband signal provided from the RF processor 1_k_-10. For example, according to an OFDM scheme, during data transmission, the baseband processor 1_k_-20 may generate complex symbols by encoding and modulating a transmitted bit string, map the complex symbols to subcarriers, and then configure OFDM symbols via an IFFT operation and CP insertion.

Also, during data reception, the baseband processor 1_k_-20 may segment the baseband signal provided from the RF processor 1_k_-10 into units of OFDM symbols, restore signals mapped to subcarriers through an FFT operation, and then restore a received bit string through demodulation and decoding. The baseband processor 1_k_-20 and the RF processor 1_k_-10 transmit and receive signals as described above. In this regard, each of the baseband processor 1_k_-20 and the RF processor 1_k_-10 may be referred to as a transmitter, a receiver, a transceiver, or a wireless communicator. The base station may transmit/receive a signal to/from a UE by using the baseband processor 1_k_-20 and the RF processor 1_k_-10, and the signal may include control information and data.

The communicator 1_k_-30 may provide an interface for communicating with other nodes in a network. That is, the communicator 1_k_-30 may convert a bit string transmitted from a main base station to another node such as a sub-base station or a core network into a physical signal, and may convert a physical signal received from the other node into a bit string. The communicator 1_k_-30 may be a backhaul communicator.

The storage 1_k_-40 may store data such as basic programs for an operation of the base station, application programs, configuration information, and the like. In particular, the storage 1_k_-40 may store information about a bearer allocated to an accessed UE, a measurement result reported from the accessed UE, and the like. Also, the storage 1_k_-40 may store information that is a criterion for determining whether to provide or stop multi-connections to the UE. The storage 1_k_-40 may provide stored data according to a request of the controller 1_k_-50. Furthermore, the storage 1_k_-40 provides stored data according to a request of the controller 1_k_-50. The storage 1_k_-40 may include a storage medium, such as a ROM, a RAM, a hard disk, a CD-ROM, or a DVD, or a combination thereof. Also, the storage 1_k_-40 may be configured in a plurality of memories. According to an embodiment, the storage 1_k_-40 may store a program for performing a method of performing cell reselection described above.

The controller 1_k_-50 may control overall operations of the base station. For example, the controller 1_k_-50 may transmit/receive signals through the baseband processor 1_k_-20 and the RF processor 1_k_-10 or through the communicator 1_k_-30. Also, the controller 1_k_-50 may record and read data to and from the storage 1_t_-40. To this end, the controller 1_k_-50 may include at least one processor. At least one component in the base station may be implemented as one single chip. Furthermore, each element of the base station may operate to perform the above-described embodiments of the disclosure.

Methods according to the claims of the disclosure or the embodiments described in the specification may be implemented by hardware, software, or a combination of hardware and software.

When the methods are implemented by software, a computer-readable storage medium storing one or more programs (software modules) may be provided. The one or more programs stored in the computer-readable storage medium are configured to be executed by one or more processors in an electronic device. The one or more programs include instructions for allowing the electronic device to execute the methods according to the claims or the embodiments described in the specification.

The programs (e.g., software modules or software) may be stored in a random-access memory (RAM), a non-volatile memory including a flash memory, a read-only memory (ROM), an electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in a memory configured by combining some or all of the above storage media. Also, a plurality of constituent memories may be provided.

Also, the programs may be stored in an attachable storage device accessible through any or a combination of a communication network such as the Internet, an intranet, a local area network (LAN), a wide LAN (WLAN), or a storage area network (SAN), or a combination thereof. Such a storage device may be connected to a device according to an embodiment of the disclosure through an external port. Also, a separate storage device on a communication network may connect to a device according to an embodiment of the disclosure.

In specific embodiments of the disclosure described above, components included in the disclosure are expressed in a singular or plural form according to the specific embodiments of the disclosure. However, singular or plural expressions have been selected properly for a condition provided for convenience of description, and the present disclosure is not limited to singular or plural components. Components expressed as plural may be configured as a single component, or a component expressed as singular may be configured as plural components.

Although specific embodiments of the disclosure are described in the detailed description of the disclosure, various modifications may be made without departing from the scope of the disclosure. Hence, the scope of the disclosure is not limited to the above embodiments of the disclosure, and may be defined by not only the following claims but also equivalents thereof.

The invention claimed is:

1. An operating method of a user equipment (UE) in a wireless communication system, the operating method comprising:

receiving a system information block (SIB) from a serving cell;

identifying areaScope information for the received SIB and areaScope information for a stored SIB;

determining whether the serving cell is a non-public network (NPN)-only cell;

in case that the serving cell is the NPN-only cell and the UE is an NPN capable UE, determining whether a first NPN identity included in an NPN-IdentityInfoList and one or more parameters for the received SIB are identical to an NPN identity and one or more parameters associated with the stored SIB without determining whether a first public land mobile network (PLMN) identity included in a PLMN-IdentityInfoList for the received SIB is identical to a PLMN identity associated with the stored SIB; and in case that the first NPN identity and the one or more parameters for the received SIB are identical to the NPN identity and the one or more parameters associated with the stored SIB, determining that the stored SIB is valid for the serving cell, and otherwise, determining that the stored SIB is invalid for the serving cell.

2. The operating method of claim 1, wherein the identifying of the areaScope information for the received SIB and the areaScope information for the stored SIB comprises:

identifying that an areaScope value for the stored SIB is identical to an areaScope value in si-SchedulingInfo for the received SIB.

3. The operating method of claim 2, wherein the one or more parameters for the received SIB comprises a systemInformationAreaID and a valueTag that are included in the si-SchedulingInfo, and the one or more parameters associated with the stored SIB comprises a systemInformationAreaID and a valueTag associated with the stored SIB.

4. The operating method of claim 1, wherein the identifying of the areaScope information for the received SIB and the areaScope information for the stored SIB comprises;

identifying that there is no areaScope for the stored SIB and an areaScope value is not included in si-SchedulingInfo for the received SIB.

5. The operating method of claim 4, wherein the one or more parameters for the received SIB comprises a cellIdentity and a valueTag that are included in the si-SchedulingInfo, and the one or more parameters associated with the stored SIB comprises a cellIdentity and a valueTag associated with the stored SIB.

6. The operating method of claim 1, further comprising, in case that it is determined that the stored SIB is invalid for the serving cell, re-obtaining an SIB from the serving cell.

7. The operating method of claim 1, wherein the NPN-only cell is a cell available only to an NPN subscriber.

8. A user equipment (UE) in a wireless communication system, the UE comprising:

a transceiver; and at least one processor connected to the transceiver, wherein the at least one processor is configured to receive a system information block (SIB) from a serving cell, identify areaScope information for the received SIB and areaScope information for a stored SIB, determine whether the serving cell is a non-public network (NPN)-only cell, in case that the serving cell is the NPN-only cell and the UE is an NPN capable UE, determine whether a first NPN identity included in an NPN-IdentityInfoList and one or more parameters for the received SIB are identical to an NPN identity and one or more parameters associated with the stored SIB without determining whether a first public land mobile network (PLMN) identity included in a PLMN-IdentityInfoList for the received SIB is identical to a PLMN identity associated with the stored SIB, and in case that the first NPN identity and the one or more parameters for the received SIB are identical to the NPN identity and the one or more parameters associated with the stored SIB, determine that the stored SIB is valid for the serving cell, and otherwise, determine that the stored SIB is invalid for the serving cell.

9. The UE of claim 8, wherein the at least one processor is further configured to identify that an areaScope value for the stored SIB is identical to an areaScope value in si-SchedulingInfo for the received SIB.

10. The UE of claim 9, wherein the one or more parameters for the received SIB comprises a systemInformationAreaID and a valueTag that are included in the si-SchedulingInfo, and the one or more parameters associated with the stored SIB comprises a systemInformationAreaID and a valueTag associated with the stored SIB.

11. The UE of claim 8, wherein the at least one processor is further configured to identify that there is no areaScope for the stored SIB and an areaScope value is not included in si-SchedulingInfo for the received SIB.

12. The UE of claim 11, wherein the one or more parameters for the received SIB comprises a cellIdentity and a valueTag that are included in the si-SchedulingInfo, and the one or more parameters associated with the stored SIB comprises a cellIdentity, and a valueTag associated with the stored SIB.

13. The UE of claim 8, wherein the at least one processor is further configured to, in case that it is determined that the stored SIB is invalid for the serving cell, re-obtain an SIB from the serving cell.

* * * * *